United States Patent
Moore et al.

(10) Patent No.: US 10,113,879 B2
(45) Date of Patent: Oct. 30, 2018

(54) HIERARCHY OF TOOLS FOR NAVIGATION

(71) Applicant: Apple Inc., Cupertino, CA (US)

(72) Inventors: Bradford A. Moore, San Francisco, CA (US); Joshua C. Weinberg, San Jose, CA (US); Jorge Fino, San Jose, CA (US); Mark B. Larus, San Francisco, CA (US); Sarah G. Barbour, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 215 days.

(21) Appl. No.: 14/254,282

(22) Filed: Apr. 16, 2014

(65) Prior Publication Data

US 2015/0300832 A1    Oct. 22, 2015

Related U.S. Application Data

(60) Provisional application No. 61/947,999, filed on Mar. 4, 2014, provisional application No. 61/947,390, filed on Mar. 3, 2014.

(51) Int. Cl.
  *G01C 21/36* (2006.01)
  *H04W 4/12* (2009.01)
  (Continued)

(52) U.S. Cl.
  CPC .......... *G01C 21/36* (2013.01); *G01C 21/3611* (2013.01); *G01C 21/3614* (2013.01);
  (Continued)

(58) Field of Classification Search
  CPC ................ G01C 21/36; G01C 21/3617; G01C 21/3608; G01C 21/3611; G01C 21/3664;
  (Continued)

(56) References Cited

U.S. PATENT DOCUMENTS 6,653,948 B1   11/2003   Kunimatsu et al.
7,487,918 B2   2/2009    Kudo et al.
(Continued)

FOREIGN PATENT DOCUMENTS

DE        69628904      5/2014
DE       112013002794   4/2015
(Continued)

OTHER PUBLICATIONS

Yang, Zhaosheng, et al., "Design of Intelligent In-vehicle Navigation Systems for Dynamic Route Guidance with Real-time Information," IEEE International Conference on Vehicular Electronics and Safety, Dec. 13-15, 2006, pp. 184-188, IEEE.
(Continued)

*Primary Examiner* — Marcus Hammonds
(74) *Attorney, Agent, or Firm* — Invoke

(57) ABSTRACT

Some embodiments provide a mapping application that provides a variety of UI elements for allowing a user to specify a location (e.g., for viewing or serving as route destinations). In some embodiments, these location-input UI elements appear in succession on a sequence of pages, according to a hierarchy that has the UI elements that require less user interaction appear on earlier pages in the sequence than the UI elements that require more user interaction. In some embodiments, the location-input UI elements that successively appear in the mapping application include (1) selectable predicted-destination notifications, (2) a list of selectable predicted destinations, (3) a selectable voice-based search affordance, and (4) a keyboard. In some of these embodiments, these UI elements appear successively on the following sequence of pages: (1) a default page for presenting the predicted-destination notifications, (2) a destination page for presenting the list of predicted destinations,
(Continued)

(3) a search page for receiving voice-based search requests, and (4) a keyboard page for receiving character input.

18 Claims, 25 Drawing Sheets

(51) Int. Cl.
  *H04W 4/02* (2018.01)
  *G06F 17/30* (2006.01)
(52) U.S. Cl.
  CPC ... *G01C 21/3617* (2013.01); *G06F 17/30241* (2013.01); *G06F 17/30401* (2013.01); *H04W 4/02* (2013.01); *H04W 4/12* (2013.01)
(58) Field of Classification Search
  CPC ........ G06F 17/30241; G06F 17/30401; H04W 4/02; H04W 4/12; H04W 64/006
  USPC ............... 455/456.1–457; 340/988–996; 701/400–541
  See application file for complete search history.

(56) References Cited

U.S. PATENT DOCUMENTS

| | | | |
|---|---|---|---|
| 7,555,725 B2 | 6/2009 | Abramson et al. | |
| 7,885,761 B2 | 2/2011 | Tajima et al. | |
| 7,925,982 B2 | 4/2011 | Parker et al. | |
| 8,260,550 B2 | 9/2012 | Highstrom et al. | |
| 8,473,868 B1 | 6/2013 | Kauffman | |
| 9,170,122 B2 | 10/2015 | Moore et al. | |
| 9,200,915 B2 | 12/2015 | Vulcano et al. | |
| 9,347,787 B2 | 5/2016 | Moore et al. | |
| 2002/0183924 A1* | 12/2002 | Yokota | G01C 21/36 701/410 |
| 2007/0150174 A1* | 6/2007 | Seymour | G01C 21/3617 701/532 |
| 2007/0150464 A1* | 6/2007 | Brave | G06F 17/30867 |
| 2009/0018766 A1 | 1/2009 | Chen et al. | |
| 2009/0112462 A1 | 4/2009 | Lo | |
| 2009/0216732 A1 | 8/2009 | Feng | |
| 2009/0248285 A1* | 10/2009 | Bauer | G01C 21/362 701/117 |
| 2010/0152997 A1 | 6/2010 | De et al. | |
| 2010/0324816 A1* | 12/2010 | Highstrom | G01C 21/367 701/533 |
| 2011/0125398 A1 | 5/2011 | Bos | |
| 2011/0130961 A1 | 6/2011 | Kuenzner et al. | |
| 2011/0161001 A1 | 6/2011 | Fink | |
| 2011/0231091 A1 | 9/2011 | Gourlay et al. | |
| 2011/0238289 A1* | 9/2011 | Lehmann | G01C 21/3438 701/533 |
| 2012/0253823 A1* | 10/2012 | Schalk | G08G 1/096877 704/270.1 |
| 2012/0265433 A1 | 10/2012 | Viola et al. | |
| 2013/0103313 A1 | 4/2013 | Moore et al. | |
| 2013/0158855 A1 | 6/2013 | Weir et al. | |
| 2013/0166096 A1* | 6/2013 | Jotanovic | G01C 21/3617 701/1 |
| 2013/0231859 A1 | 9/2013 | Kim et al. | |
| 2013/0322665 A1 | 12/2013 | Bennett et al. | |
| 2013/0328768 A1* | 12/2013 | Tanaka | G06F 3/167 345/156 |
| 2013/0345961 A1* | 12/2013 | Leader | G01C 21/3617 701/410 |
| 2014/0222435 A1* | 8/2014 | Li | G01C 21/3608 704/275 |
| 2014/0278051 A1 | 9/2014 | McGavran et al. | |

FOREIGN PATENT DOCUMENTS

| | | |
|---|---|---|
| EP | 0789224 | 8/1997 |
| EP | 2088501 | 8/2009 |
| EP | 2369299 A1 | 9/2011 |
| EP | 2672225 A2 | 12/2013 |
| WO | WO 2004/104520 | 12/2004 |
| WO | WO 2009/143876 | 12/2009 |
| WO | WO 2010/040405 | 4/2010 |
| WO | WO 2013/037852 | 3/2013 |

OTHER PUBLICATIONS

Qu, Huamin, et al., "Focus+Context Route Zooming and Information Overlay in 3D Urban Environments," IEEE Transactions on Visualization and Computer Graphics, vol. 15, No. 6, Nov./Dec. 2009, pp. 1547-1554, IEEE Computer Society.

* cited by examiner

HIERARCHY OF TOOLS FOR NAVIGATION

BACKGROUND

Mobile devices are moving towards having access to larger amounts and varying types of personalized information, either stored on the device itself or accessible to the device over a network (e.g., in the cloud). This enables the users of such devices to store and subsequently access this information about their lives. To the users of mobile devices, this information may include their personal calendar (i.e., stored in a calendar application), their e-mail, mapping information (e.g., user-entered locations, user-requested routes, etc.), etc.

However, at the moment, these devices require users to specifically request information in order for the devices to present the information. For instance, if a user wants a route to a particular destination, the user must enter information into the mobile device (e.g., via a touchscreen, voice input, etc.) requesting the route. Given the amount of data accessible to a mobile device, a device that leverages this data in order to automatically provide the needed information would be useful.

BRIEF SUMMARY

Some embodiments provide a mapping application with novel navigation and/or search tools. In some embodiments, the mapping application formulates predictions about future destinations of a device that executes the mapping application, and provides dynamic notifications regarding these predicted destinations. For instance, when a particular destination is a likely destination (e.g., most likely destination) of the device, the mapping application in some embodiments presents a notification regarding the particular destination (e.g., plays an animation that presents the notification). This notification in some embodiments provides some information about (1) the predicted destination (e.g., a name and/or address for the predicted destination) and (2) a route to this predicted destination (e.g., an estimated time of arrival, distance, and/or amount of ETD for the predicted destination). In some embodiments, the notification is a dynamic not only because it is presented dynamically as the device travels, but also because the information that the notification displays about the destination and/or route to the destination is dynamically updated by the mapping application as the device travels.

In some embodiments, the predicted-destination notification is a selectable item through a user interface (UI) item of the device. As further described below, selection of this notification in some embodiments directs the mapping application to present route overview or navigation options with respect to the particular destination that is subject of the notification. In some embodiments, the mapping application removes this notification after a period of time if it has not received any user input with respect to this notification. In other embodiments, the mapping application re-computes the likelihood that the particular destination is a likely destination of the device as the device travels, and removes the notification (e.g., through an animation) when it determines that the particular destination is no longer a likely destination (e.g., the most likely destination) of the device based on the re-computation. After removing the notification, the mapping application in some embodiments continues its prediction computations and provides notification of a new predicted destination when it identifies based on its computations another destination as a likely destination of the device.

In some embodiments, the selection of a dynamic predicted-destination notification directs the mapping application to present a page that displays one or more routes to the notification's predicted destination and/or provides a brief summary of this destination. In these or other embodiments, the selection of the predicted-destination notification directs the mapping application to provide options for either (1) a turn-by-turn prompting navigation presentation that provides maneuver instruction prompts at junctures along a route to the destination, or (2) a non-prompting navigation presentation that provides information about the distance to the destination but does not provide maneuver instruction prompts at junctures along the route.

In some embodiments, during either the non-prompting navigation presentation or the turn-by-turn prompting navigation presentation, the mapping application (1) tracks the position of the device with respect to a route that is being navigated to a particular destination, (2) provides updated information regarding this navigation (e.g., updated estimated time of arrival, distance, and estimated time to destination), and (3) provides an updated route to the particular destination, and/or updated information about an updated route, after the device goes off the previously specified route to the particular destination. To perform these operations, the mapping application identifies the location of the device by using location-tracking services (e.g., GPS services, WiFi-location based services, etc.) of the device and correlates this location to the location of the route that is being navigated and to the particular destination of the route.

In turn-by-turn prompting navigation, the mapping application provides navigation instructions (verbal, graphical and/or text instructions) regarding a navigation maneuver as the device approaches a juncture along the navigated route at which a user may need to make a decision regarding a maneuver to perform. In some embodiments, the mapping application provides the turn-by-turn navigation instructions as part of a navigation presentation that includes a representation of the navigated route (e.g., a colored line that traverses a road network presented on a navigation map) and a representation of the device as it travels along the navigated route.

On the other hand, the non-prompting navigation mode in some embodiments does not provide turn-by-turn navigation instructions for the navigated route. In other words, as the device approaches a juncture along the navigated route, the mapping application does not provide specific maneuver instructions (verbal, graphical and/or text instructions) regarding a navigation maneuver to perform at the juncture. In some embodiments, the non-prompting navigation mode (1) provides a set of one or more distance metrics to the destination, such as estimated time of arrival (ETA), physical distance (e.g., in feet, meters, miles, kilometers, etc.) to destination, and/or estimated time to destination (ETD), and (2) updates the displayed metric data as the device travels (e.g., as the device approaches the destination, goes off route, etc.). The non-prompting navigation mode in some embodiments provides the set of distance metrics as a display that is presented with the navigation presentation.

In some embodiments, the non-prompting navigation mode provides a navigation presentation that includes a representation of the navigated route (e.g., a colored line that traverses a road network presented on a navigation map) and a representation of the device as it travels along the navigated route. In other embodiments, however, the non-prompting navigation mode does not provide a navigation presentation that includes a representation of the navigated route and/or a representation of the device. For instance, during a non-prompting navigation mode, the mapping application in some embodiments only presents data regarding the route being navigated. In some embodiments, the mapping application presents this data with a navigation presentation that displays the area (e.g., the road network) being navigated.

Also, as mentioned above, the mapping application in either turn-by-turn prompting navigation mode or non-prompting navigation mode, performs re-routing operations to identify a new route to navigate to a particular destination, when the device traverses off a previously computed route to the particular destination. In turn-by-turn navigation presentation and the non-prompting mode navigation presentation of some embodiments, the re-routing operation results in a presentation of the newly computed route to navigate. However, in some embodiments, the non-prompting mode navigation modality does not provide a presentation of the new route, but only provides new data regarding the newly computed route (e.g., presents new ETA, distance, ETD data for the new route).

During either navigation modality (i.e., during either turn-by-turn or non-prompting navigation), the mapping application presents a display area (e.g., a display area that overlaps a map) that displays data about the route that is being navigated. In some embodiments, the application updates the data as the device travels along the navigated route (e.g., updates the ETA, distance to destination, time to destination, etc.). Also, in some embodiments, selection of this display area during either modality directs the mapping application to switch to the other navigation modality.

One of ordinary skill will realize that other embodiments may implement the non-prompting navigation mode differently. For instance, some embodiments described above provide the option of entering non-prompting mode navigation after a user selects a notification that is presented regarding a predicted destination of the device. Other embodiments, however, have the mapping application automatically enter non-prompting mode when this application has predicted with a high certainty that the device is headed towards a particular destination (e.g., home). Given the automatic selection of this modality, the mapping application of some embodiments presents a simple non-prompting presentation, as the user may not wish to see too much navigation clutter in the presentation since the user did not affirmatively request this data. For instance, after identifying a predicted destination with a high certainty level, the mapping application in some embodiments displays only data about the predicted destination during the non-prompting mode. In some of these embodiments, the mapping application maintains this display until the device reaches the predicted destination or travels far enough off course from this destination that the application eliminates the destination as a predicted destination with a high level of certainty.

The mapping application of some embodiments provides predicted destination through other UI constructs instead of, or in conjunction with, the predicted-destination notifications. For instance, in some embodiments, the mapping application has a destination page that lists one or more predicted destinations for the device at any given time. In some embodiments, the predicted destinations that are presented on destination page include (1) destinations that are machine-generated from the previous locations of the device or the user of the device, (2) addresses that are harvested from telecom messages (e.g., e-mails, text messages, etc.), calendar events, calendar invites, electronic tickets, or other electronic documents, and (3) searches that are made through the mapping application. The mapping application in some embodiments computes ranking scores for some or all of these destinations (e.g., for some or all of the machine-generated destinations, the harvested addresses, and searched addresses) and presents at least some of these destinations according to the computed rankings The mapping application of some embodiments always presents some predicted destinations (e.g., machine-generated destinations) ahead of other destinations (e.g., harvested or searched destinations).

The destination page is part of a sequence of pages that progressively provide additional location input methods that require increased levels of user interaction to specify a location. Specifically, the mapping application of some embodiments provides a variety of UI elements for allowing a user to specify a location (e.g., for viewing or serving as route destinations). In some embodiments, these location-input UI elements appear in succession on a sequence of pages, according to a hierarchy that has the UI elements that require less user interaction appear on earlier pages in the sequence than the UI elements that require more user interaction.

In some embodiments, the location-input UI elements that successively appear in the mapping application include (1) selectable predicted-destination notifications, (2) a list of selectable predicted destinations, (3) a selectable voice-based search affordance, and (4) a keyboard. In some of these embodiments, these UI elements appear successively on the following sequence of pages: (1) a default page for presenting the predicted-destination notifications, (2) a destination page for presenting the list of predicted destinations, (3) a search page for receiving voice-based search requests, and (4) a keyboard page for receiving character input.

For instance, in some embodiments, the default page of the mapping application provides predicted-destination notifications regarding machine-generated predicted destination and allows these notifications to be selected to obtain map views, navigation options, and/or route options to the predicted destination. This page also includes a destination page option, which, when selected, directs the application to present the destination page. Once presented, the destination page provides a list of possible destinations, along with a selectable search affordance. Selection of one of the possible destinations in the list directs the mapping application to provide map views, navigation options, and/or route options to the selected destination. Alternatively, selection of the search affordance on the destination page directs the application to present a search page that includes a voice-based search affordance and a selectable keyboard affordance. Selection of the voice-based search item directs the application to process a voice-based search. Selection of the selectable keyboard affordance directs the application to present a keyboard page that displays a keyboard through which a user can provide a series of character inputs that are to serve as a search string for a search query.

In some embodiments, selection of a predicted-destination notification directs the mapping application to provide navigation options (e.g., non-prompting and turn-by-turn prompting navigation options) to the notification's predicted destination, whereas the selection of a predicted destination on a list of predicted destinations or the selection of search result directs the mapping application provide a route preview page that allows the user to step through various routes to the destination or search result. In other embodiments, the selection of the predicted-destination notification also leads to a presentation of the route overview page.

The route preview page provides a map that shows a selected destination or search result. In some embodiments, this page also provides a novel combination of UI elements that allow a user (1) to explore alternative routes to a selected destination or search result, (2) to explore routes to other destinations or search results that appeared on another page (e.g., on a destination list page or on a search-result page) with the selected destination or search result. In some embodiments, the route overview page also provides a modal zoom tool that allows the map on this page to zoom to the destination/search result or zoom out to an overview of the entire route to the destination/search result.

These three tools (i.e., the tool for exploring alternative routes to one location, the tool for exploring routes to other locations, and the tool for providing modal zoom operations) are highly beneficial in allowing a user to navigate to a location because they allow the user to quickly explore the two-dimensional solution space of possible locations and possible routes to the locations. For example, a user of the mapping application may search for a coffee shop in San Francisco. In some embodiments, the mapping application provides a list of coffee shops on a search result page, and the user selects a particular shop from the list. The mapping application then provides a map that presents the particular shop along with the above-described three tools. The user can then use the three tools to quickly cycle through different routes to the selected shop, to different routes to other shops listed on the search result page, and to zoom in/out of each examined shop location, in order to identify an ideal coffee shop in a desired locality.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
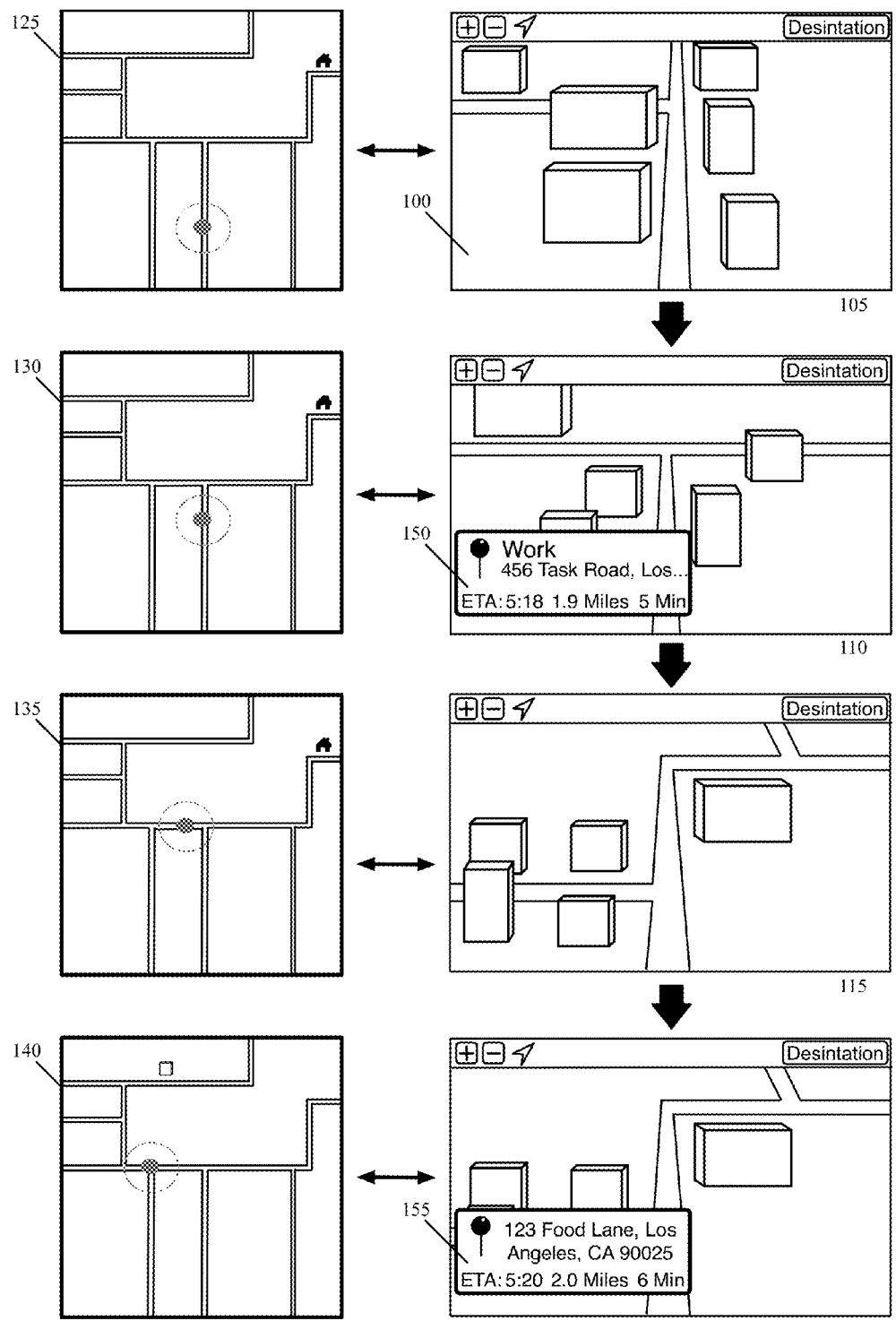
FIG. 1 illustrates the predicted-destination notifications of a mapping application that executes on a mobile device in some embodiments.

Some embodiments provide a mapping application with novel navigation and/or search tools. In some embodiments, the mapping application formulates predictions about future destinations of a device that executes the mapping application, and provides dynamic notifications regarding these predicted destinations. FIG. 1 illustrates the predicted-destination notifications of a mapping application that executes on a mobile device in some embodiments of the invention. Specifically, this figure illustrates four operational stages 105-120 of a user interface 100 of the mobile device, as the device traverses a route that is shown in four stages 125-140 in FIG. 1.

In some embodiments, the user interface (UI) 100 is displayed on a display screen of the mobile device. In other embodiments, the UI 100 is displayed on another device's display screen but it is generated by the mobile device. For instance, in some embodiments, the mobile device connects (e.g., through a wired or wireless connection) with a vehicle's electronic system, and the UI 100 is displayed on an information display screen of the vehicle. Examples of such connections are described in U.S. patent application Ser. No. 14/081,896, now issued as U.S. Pat. No. 9,200,915, which is incorporated herein by reference. Other figures described below also present user interfaces that are driven by mobile devices. Like the example illustrated in FIG. 1, the UI examples illustrated in these other figures are either displayed on the mobile device's screen or on a screen of another device (e.g., a vehicle) that is driven by the mobile device.

As the mobile device travels along a route, the mapping application of FIG. 1 formulates predictions regarding the possible destinations of the device, and presents a notification regarding a particular destination when the particular destination is a likely destination (e.g., most likely destination) of the device. In some embodiments, the mapping application computes scores (e.g., probability values) for possible destinations, and presents a destination as a predicted destination when its score meets a certain criteria, e.g., passes a threshold, is greater than the computed likelihood scores of other possible destinations by a certain amount, or both. The mapping application in some embodiments continuously formulates predictions about possible destination as the device travels.

The first UI operational stage 105 shows a map that the mapping application presents while the device travels along a road shown in the first route stage 125. At this stage, the mapping application has not identified any particular destination that is the likely destination of the device. This might be because no destination at this stage has a computed score that meets the required criteria, e.g., that passes a threshold value or is greater than the scores for the other destinations by a particular amount.

By the time the device reaches a location shown in the second route stage 130, the mapping application has computed new scores for the device's possible destinations and based on these scores has determined that the device is traveling to the user's work. Accordingly, in the second UI operational stage 110, the mapping application shows a predicted-destination notification 150 as an overlay (as a display area) over the map displayed by the mapping application. In some embodiments, the mapping application presents the notification 150 when the user's work is the most likely destination for the device and the computed score for this destination exceeds a threshold value or exceeds the scores of the other destinations by a particular amount. Also, in some embodiments, the mapping application uses an animation to present the notification 150 (e.g., presents an animation that shows the notification sliding from a position off-screen to the position shown in the second stage 130, or that shows the notification popping open of fading in at the location shown in the second stage 130).

In the example of FIG. 1, this notification 150 provides the destination's name and address and an estimated time of arrival, distance, and amount of time to the destination. In other embodiments, this notification provides other information about the predicted destination and/or a route to this predicted destination. In some embodiments, the notification 150 provides other information (e.g., traffic data, such as traffic congestion, road construction, etc.) about the predicted destination.

In some embodiments, the notification 150 is dynamic not only because it is presented dynamically as the device travels, but also because the information that the notification displays about the destination and/or route to the destination dynamically is updated by the mapping application as the device travels. This will be further described below in FIG. 2.

In some embodiments, the notification 150 is a selectable item in the UI 100, and the selection of this notification item directs the mapping application to present information (e.g., route overview) or navigation options with respect to the particular destination that is subject of the notification. For instance, in some embodiments, the selection of a predicted-destination notification directs the mapping application to present a page that displays one or more routes to the predicted destination and/or provides a brief summary of the predicted destination.

In other embodiments, the selection of the predicted-destination notification directs the mapping application to provide options for either (1) a non-prompting navigation presentation to this destination, or (2) a turn-by-turn prompting navigation presentation to this destination, as further described below by reference to FIG. 3. During either of these presentations, the mapping application tracks the device's current position (e.g., as identified by location engine (e.g., GPS) of the device) at various locations along the route to provide its presentation.

Based on this tracking, the mapping application during a turn-by-turn navigation presentation, provides navigation instructions (verbal, graphical and/or text instructions) regarding a navigation maneuver as the device approaches a juncture along the navigated route at which a user may need to make a decision regarding a maneuver to perform. To do this, the mapping application has to correlate the device's current position to the route so that it can provide real time maneuver instructions to guide the user's maneuvers at junctures along the route.

The non-prompting navigation mode in some embodiments does not provide turn-by-turn navigation instructions for the navigated route. In other words, as the device approaches a juncture along the navigated route, the mapping application does not provide navigation instructions (verbal, graphical and/or text instructions) regarding a navigation maneuver to perform at the juncture. In some embodiments, the non-prompting navigation mode (1) provides a set of one or more distance metrics to the destination, such as estimated time of arrival (ETA), physical distance (e.g., in feet, meters, miles, kilometers, etc.) to destination, and/or estimated time to destination (ETD), and (2) updates the displayed metric data as the device travels (e.g., as the device approaches the destination, goes off route, etc.). The non-prompting navigation mode in some embodiments provides the set of distance metrics as a display that is presented with the navigation presentation.

In some embodiments, the mapping application in either turn-by-turn prompting navigation mode or non-prompting navigation mode, performs re-routing operations to identify a new route to navigate to a particular destination, when the device traverses off a previously computed route to the particular destination. Also, in some embodiments, both turn-by-turn and non-prompting navigation modes provide a navigation presentation that includes a representation of the navigated route (e.g., a colored line that traverses a road network presented on a navigation map) and a representation of the device as it travels along the navigated route. In other embodiments, however, the non-prompting navigation mode does not provide a navigation presentation that includes a representation of the navigated route. In some embodiments, the page that provides an option to select either non-prompting or turn-by-turn prompting navigation also displays one or more routes to the predicted destination, while in other embodiments this page does not display any route to the predicted destination.

The third UI operational stage 115 shows the UI 100 after the mapping application has removed the notification 150. In some embodiments, the mapping application removes this notification after a period of time if it has not received any user input with respect to this notification. In other embodiments, the mapping application removes the notification 150 when, based on new computations, it determines that the user's work is no longer a likely destination (e.g., the most likely destination) of the device. For instance, when the device travels away from user's work for a duration of time, the mapping application's computations account for this direction of travel away from the predicted destination such that the computed score for the user's work no longer satisfies the criteria needed for designating it as the predicted destination. The third route stage 135 shows the device making a left turn in this stage away from a location of the user's work address. In some embodiments, the mapping application uses an animation to remove the notification 150 (e.g., presents an animation that shows the notification sliding off the map to a position off-screen, or that shows the notification closing or fading out at the location shown in the second stage 130).

After removing the notification, the mapping application in some embodiments continues its prediction computations and provides notification of a new predicted destination when it identifies based on its computations another destination as a likely destination of the device. The fourth UI operational stage 120 shows a new notification 155 (again presented as an overlay display) regarding a newly predicted destination. In this example, the new predicted destination is specified in terms of an address that corresponds to a coffee shop, as shown in the fourth route stage 140. Like notification 150, the notification 155 provides data regarding its associated predicted destination, such as ETA, distance, and ETD data for this destination.

Figure 2:
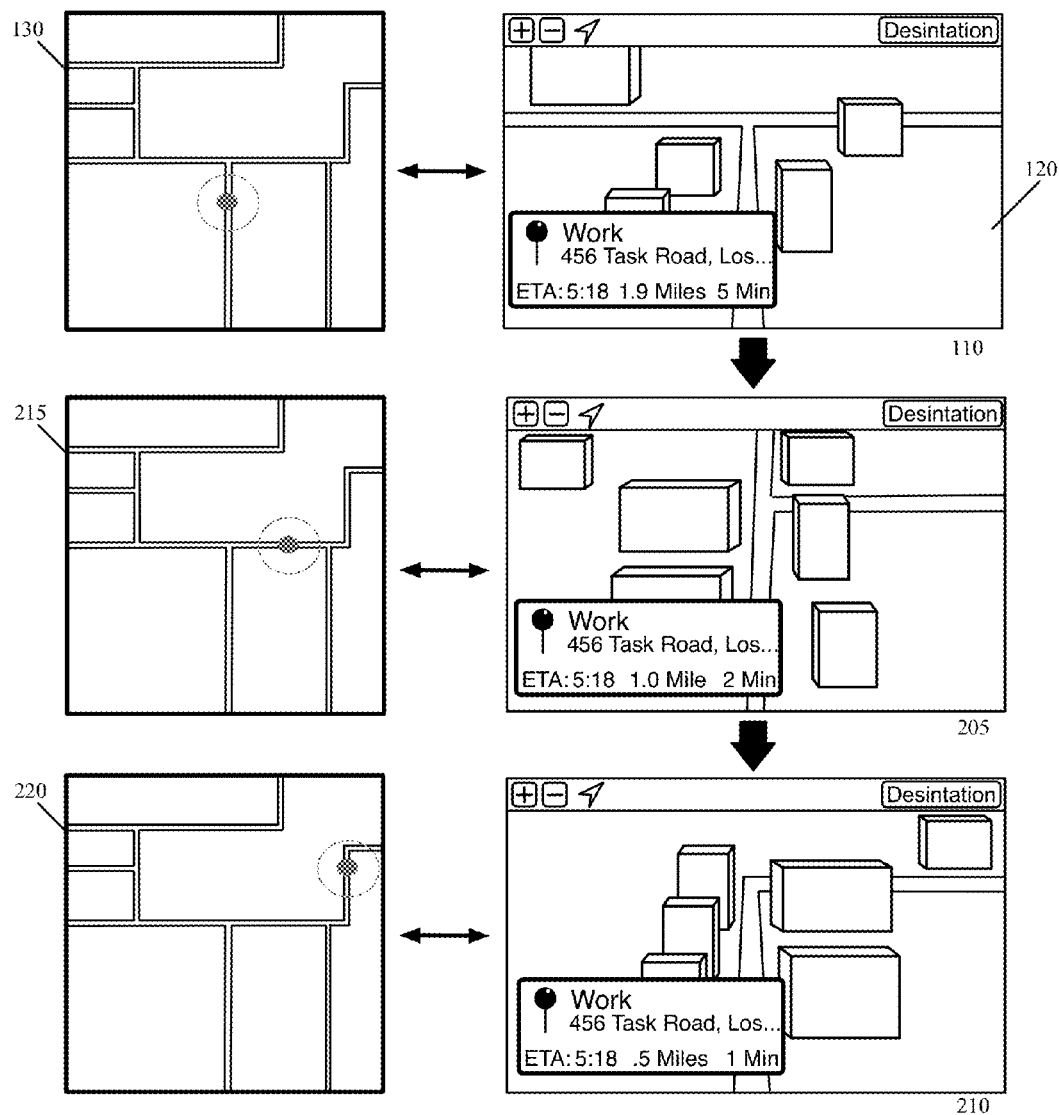
FIG. 2 provides an example of the mapping application that updates the information that is provided by a predicted-destination notification.

FIG. 2 presents an example that illustrates the mapping application updating the information that is provided by a predicted-destination notification. This example is illustrated in terms of three operational stages 110, 205, and 210 of the user interface 100 of the mobile device, as the device traverses a route that is shown in three stages 130, 215 and 220. In this example, the first operational stage 110 is identical to the second operational stage 110 of FIG. 1. In this stage 110, the mapping application shows the notification display 150 over the map as the device travels towards the user's work address, as shown in the first route stage 130.

Unlike the third route stage 135 of FIG. 1, which shows the device after it has made a left turn and is moving along a route away from the user's work, the second route stage 215 shows the device after it has made a right turn and is moving along a route towards the user's work. Accordingly, the mapping application continues to display the notification 150 during the second operational stage 205. As shown, the notification 150 in this stage has updated distance and ETD to the user's work (i.e., the distance and time values now say 1 mile and 2 minutes, instead of 1.9 miles and 5 minutes, which are the values shown in the first operational stage 110). To present this updated information, the mapping application tracks the position of the device as it travels to the predicted destination, and computes updated information regarding this travel (e.g., computes updated ETA, distance, and time information). The third operational stage 210 shows the notification 150 again with updated information. In this stage, the device has moved closer to the user's work, as shown by the third route stage 220.

As mentioned above, a predicted-destination notification is a selectable item in the UI 100 in some embodiments. FIG. 3 presents an example that illustrates that the selection of a predicted-destination notification in some embodiments directs the mapping application to provide options for either (1) a non-prompting navigation presentation to the notification's predicted destination, or (2) a turn-by-turn prompting navigation presentation to this destination. This example is shown in terms of four operational stages 305-320 of the UI 100.

The first stage 305 is similar to the second stage 110 of FIG. 1, except that in the first stage 305, the notification 150 is being selected. In this example, this selection is made by a user touching the location of the notification on a touch-sensitive screen that displays the UI 100. Several other figures also illustrate other examples that include touch-based interaction with the UI of the mapping application. However, one of ordinary skill will realize that in some embodiments, a user can interact with the mapping application's UI through other input mechanisms (e.g., cursor-based inputs, knob-controlled inputs, key-controlled inputs). Also, the display screen in some of these embodiments may not be touch-sensitive.

Figure 3:
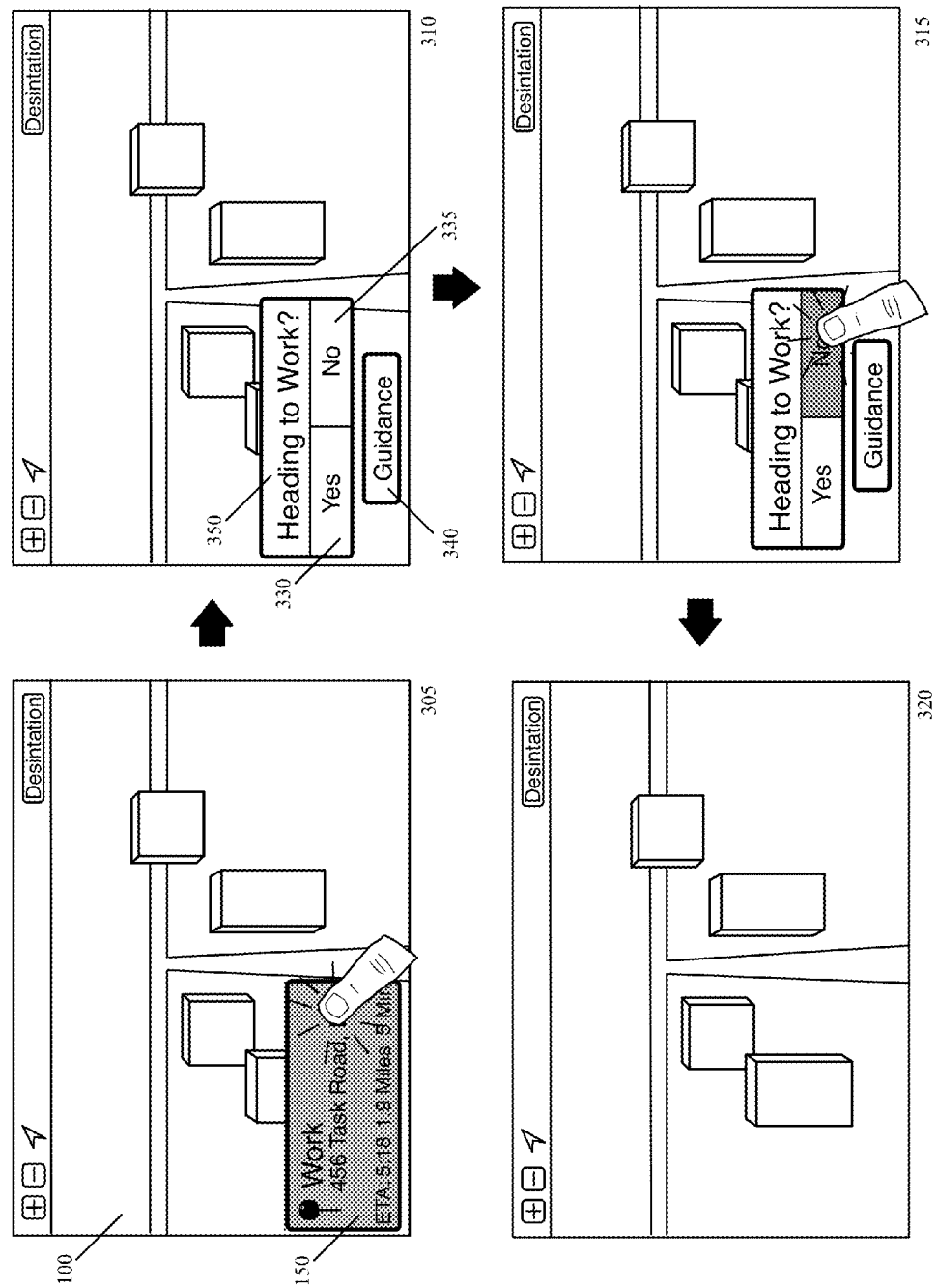
FIG. 3 illustrates the mapping application providing different options upon selection of a predicted-destination notification.

The second stage 310 of FIG. 3 illustrates that in response to the selection of the notification 150, the mapping application presents three selectable options. Two of these options, the Yes option 330 and the No option 335, relate to a question 350 regarding whether the predicted destination (i.e., the user's work in this example) is the destination of the user's current trip. Option 330 is an affirmative answer to this question, while option 335 is a negative answer to this question. The third option is a guidance option 340. In some embodiments, the mapping application shows other information during the second stage 310. For instance, on the page shown in this stage, the mapping application in some embodiments displays one or more routes to the predicted destination.

As shown by the third and fourth stages 315 and 320, the selection of the No option 335 removes the three options 330, 335 and 340 and their associated question 350. During the remainder of the current trip, the mapping application of some embodiments does not present a predicted-destination notification for the destination (i.e., the work address) that was declined (in the stage 315) as the destination for the current trip. In some embodiments, the mapping application has trip-identifying modules that use data captured by one or more motion-sensors of the mobile device to identify the current mode of transit (e.g., a car trip, a bike trip, etc.). The use of such motion-sensors is described in U.S. patent application Ser. No. 13/913,234, now published as U.S. Patent Publication 2014/0365803.

In other embodiments, the mapping application disables notifications about declined destination differently. For instance, when the device connects to a vehicle's electronic system, the mapping application of some embodiments foregoes predicted-destination notifications about a declined destination (e.g., the work address declined in the stage 315) until a user disconnects a wired connection between the device and the vehicle electronic system and then reconnects this wired connection. Once the device plugs into the vehicle electronic system again, the mapping application may again provide predicted-destination notifications regarding a previously declined destination. After a user declines a predicted destination (e.g., at 315), the mapping application of some embodiments foregoes predicted-destination notifications for all possible destinations until after the device disconnects and then reconnects with the vehicle electronic system.

In some embodiments, the selection of the Yes option 330 directs the mapping application to initiate a non-prompting navigation presentation to the predicted destination associated with this option, while the selection of the guidance option 340 directs the mapping application to initiate a turn-by-turn navigation presentation to this predicted destination.

Figure 4:
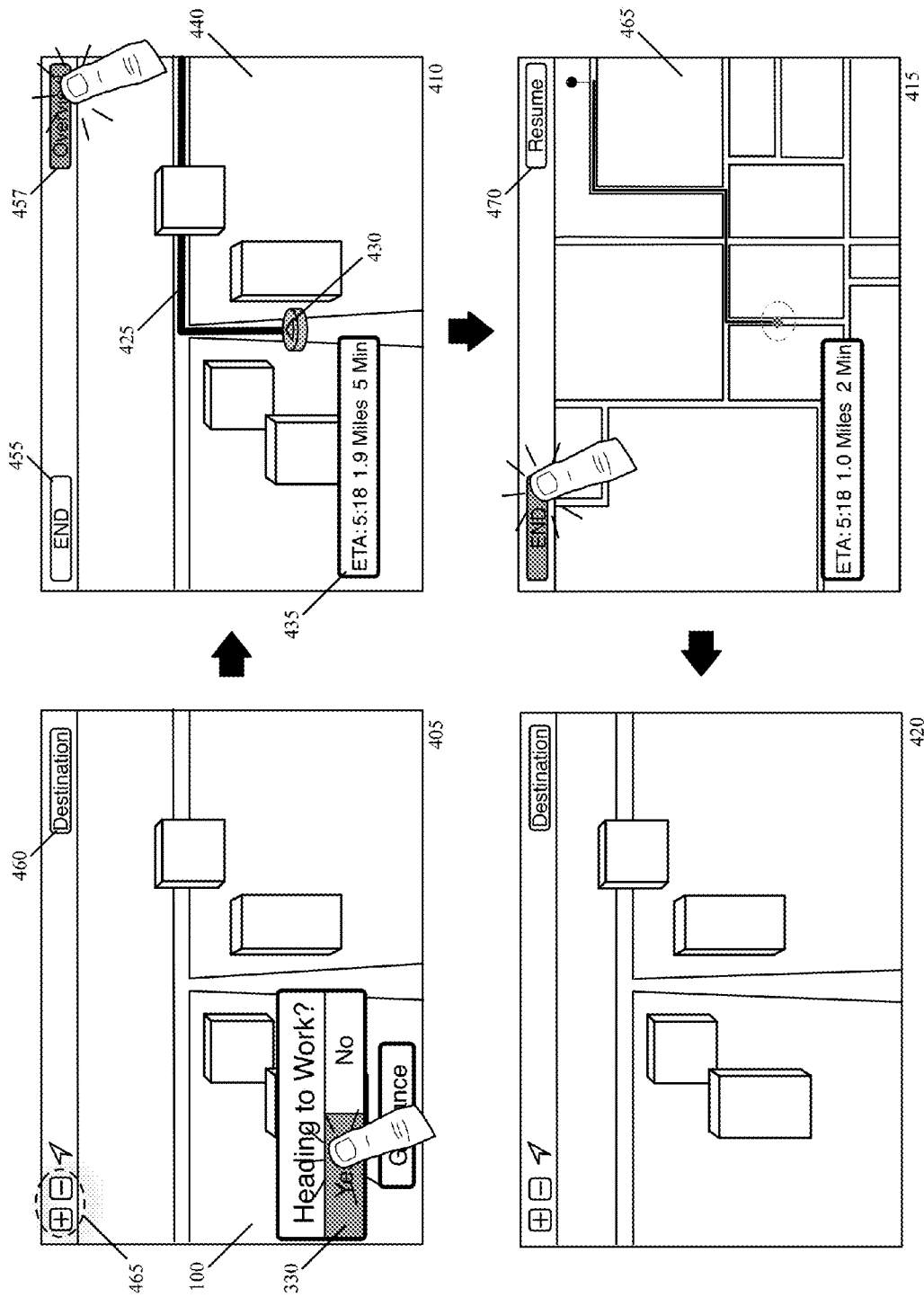
FIG. 4 presents an example that illustrates that the selection of an option directs the mapping application to initiate a non-prompting navigation presentation to the predicted destination.

FIG. 4 presents an example that illustrates that the selection of the Yes option 330 directs the mapping application to initiate a non-prompting navigation presentation to the predicted destination. This example is illustrated in four operational stages 405-420 of the UI 100. The first stage 405 shows the selection of the Yes option 330 through touch input.

This selection directs the mapping application to present a non-prompting navigation presentation 440, which is illustrated in the second stage 410. As shown in this stage, the non-prompting navigation presentation 440 of some embodiments includes a representation 425 (i.e., a colored set of lines in this example) of the navigated route, and a representation 430 (i.e., a puck in this example) of the traveling device. This presentation 440 also includes an overlay display 435 that is placed over the map that is part of the navigation presentation. The overlay display 435 presents data regarding the navigation route. In this example, this data includes the ETA, the distance and ETD data for the destination of the navigation.

The non-prompting navigation presentation also includes End and Overview UI elements 455 and 457, which were not part of the UI 100 in the first stage. These two UI elements have replaced zoom affordances 465 and Destination affordance 460 that are part of the UI 100 in the first stage. The zoom affordances 465 are for adjusting the zoom level of the map, while the Destination affordance 460 is for viewing a list of possible destinations. The destination affordance will be further described below by reference to FIG. 9.

The Overview affordance 457 allows the navigation presentation 440 to change to an overview presentation that shows the entire route to the navigated destination. In some embodiments, this overview presentation also shows the start of the route, while in other embodiments this presentation shows the remainder of the route (i.e., shows the portion of the route from the current position of the device to the navigated destination). Also, in some embodiments, the overview presentation is a two-dimensional top-down view of the navigated route.

The second stage 410 shows the selection of the Overview affordance 457. This selection causes the mapping application to show an overview presentation 465 of the navigated route, as shown by the third stage 415. The third stage 415 shows that the Overview affordance 457 has been replaced by a Resume affordance 470. Selection of the Resume affordance 470 directs the mapping application to resume its previous navigation presentation 440. The third stage also shows the distance and time values changed in the ETA-overlay display 435, which reflect the movement of the device along the route towards the navigated destination.

The End affordance 455 allows the user to end the navigation presentation. The third stage 415 illustrates the selection of this affordance, which results in the non-prompting navigation presentation ending, as shown in the fourth stage 420. In the example illustrated in FIG. 4 and some of the other figures described below, the mapping application uses the same map style for displaying a location and for providing a navigation presentation. In other embodiments, however, the mapping application uses one map style for displaying and browsing areas on the map, while using another map style for providing a navigation presentation. In some of these embodiments, the mapping application provides an animation for transitions between the two map styles, in order to make the experience appear more dynamic.

Figure 5:
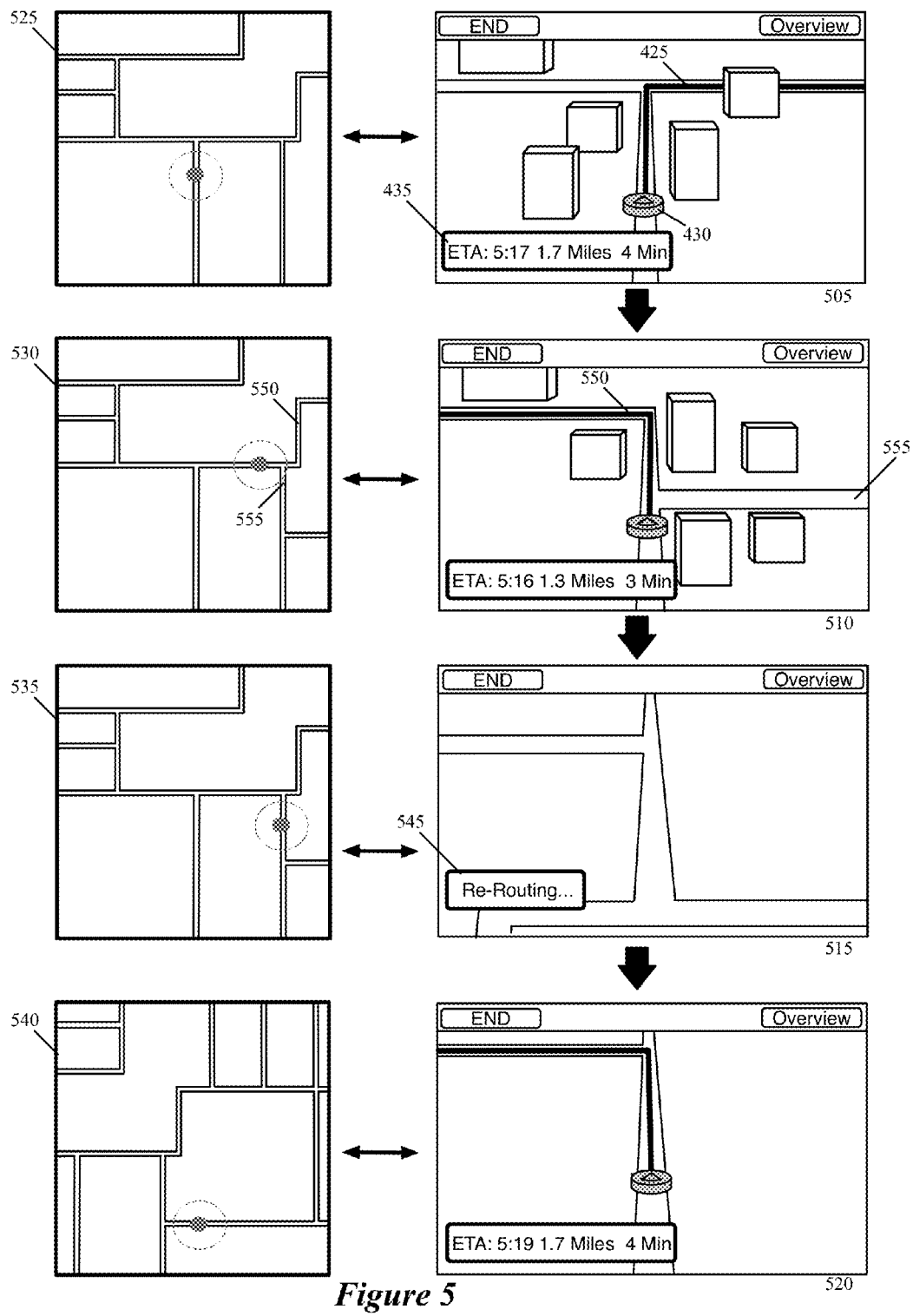
FIG. 5 illustrates an example of several operations of the mapping application during a non-prompting navigation presentation.

FIG. 5 illustrates an example of several operations of the mapping application during a non-prompting navigation presentation. This example is illustrated in terms of four operational stages 505-520 of the UI 100 as the device travels along a route, which is illustrated in terms of four route stages 525-540. The first two operational stages 505 and 510 show the mapping application providing a non-prompting navigation presentation that does not provide verbal or text maneuver instructions as the device approaches and passes a juncture along the navigated route. Other than the puck 430 and specified route line 425, this presentation does not provide any graphical indicators (e.g., arrows) as the device approaches and passes a juncture in order to highlight a maneuver at that juncture. The non-prompting navigation presentation in some embodiments does not include a representation of the navigated route and/or the navigating device. For instance, in some embodiments, the mapping application may only present during a non-prompting navigation mode data regarding the route being navigated. In some embodiments, the mapping application presents this data with a navigation presentation that displays the area (e.g., the road network) being navigated.

The first two operational stages 505 and 510 also show the information shown in the overlay 435 updated as the device moves along the navigated route. In this example, all of the data (ETA, distance, and ETD) have been updated in the second stage 510. To provide this updated information during a non-prompting navigation presentation, mapping application in some embodiments (1) tracks the position of the device with respect to a route that is being navigated to a particular destination, and (2) provides updated information regarding this navigation (e.g., updated ETA, distance, and time information). To perform these operations, the mapping application identifies the location of the device by using location-tracking services (e.g., GPS services, WiFi-location based services, etc.) of the device and correlates this location to the location of the route that is being navigated and to the particular destination of the route.

By tracking the position of the device with respect to the navigated route, the mapping application during a non-prompting navigation presentation can perform re-routing operations to identify a new route to navigate to a particular destination, when the device traverses off a previously computed route to the particular destination. The second, third and fourth operational stags 510-520 illustrate such a re-routing operations. Specifically, the second stage 510 shows that the route indicator 425 specifying that the device has to make a left turn on a street 550 after passing another street 555 on the right. The locations of these streets are also specified on the second route stage 530.

The third operational stage 515 and the third route stage 535 show the location device after it has incorrectly made a right turn on the street 555. Because of this wrong turn, the mapping application has to identify a new route to the navigated destination. Accordingly, in the operational stage 515, the mapping application removes the information overlay 435, the device representation 430 and the route representation 425, and places a re-routing banner 545 over the map to indicate that a new route is being computed. In some embodiments, the re-routing banner is not provided. For instance, in some embodiments, the re-routing notification is provided in the information overlay 435 after the information about the previously navigated route is removed from this overlay. The information and re-routing overlays 435 and 545 have different sizes and the transition between these overlays is animated.

The fourth operational stage 520 shows the non-prompting navigation presentation after the mapping application has computed a new route. This presentation includes a representation for the new route, and updated information about this new route in the information display overlay 435.

One of ordinary skill will realize that other embodiments may implement the non-prompting navigation mode differently. For instance, as shown in FIG. 4, some embodiments provide the option 330 for entering non-prompting mode navigation after a user selects a dynamic predicted-destination notification 150 (as shown in the second stage 310 of FIG. 3). Other embodiments, however, have the mapping application automatically enter non-prompting mode when this application has predicted with a high certainty that the device is headed towards a particular destination (e.g., home). Given the automatic selection of this modality, the mapping application of some embodiments presents a simple non-prompting presentation, as the user may not wish to see too much navigation clutter in the presentation since the user did not affirmatively request this data. For instance, in some embodiments, the mapping application only displays data regarding the predicted destination during the non-prompting mode. In some of these embodiments, the mapping application maintains this display until the device reaches the predicted destination or travels far enough off course from this destination that the application eliminates the destination as a predicted destination with a high level of certainty. Also, in some embodiments, the non-prompting navigation presentation provides notifications of unexpected events, such as heavy traffic or lane closures along the route.

Figure 6:
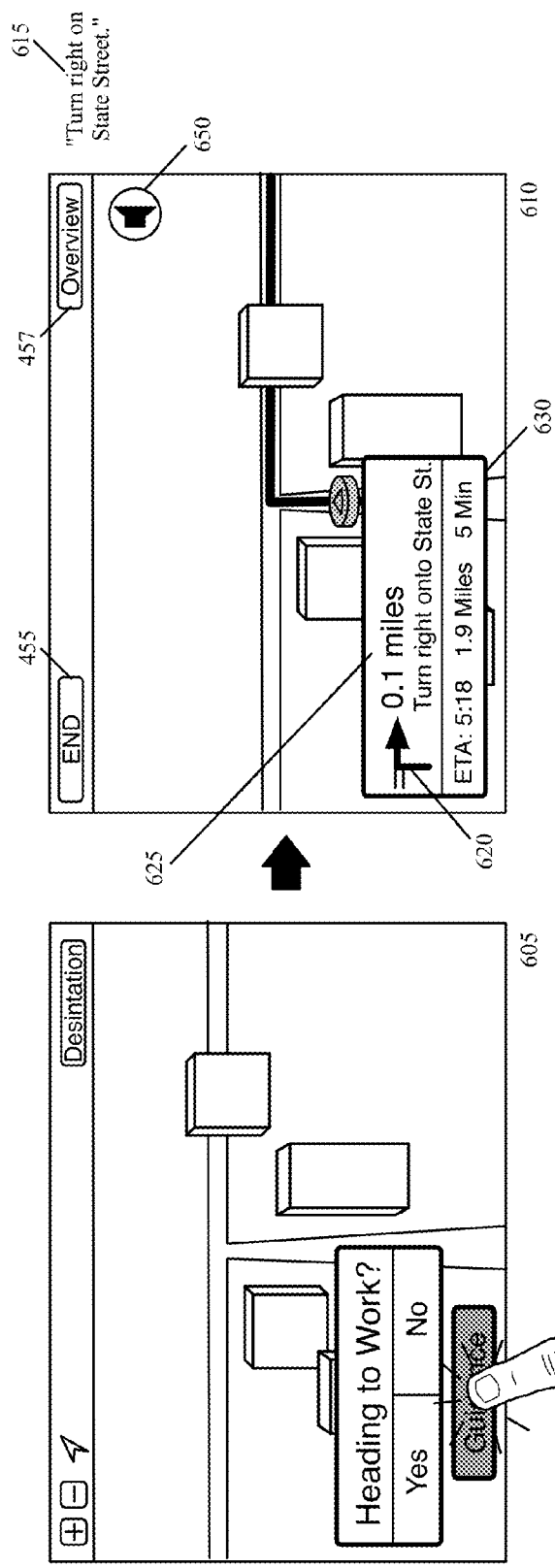
FIG. 6 illustrates the selection of an option that directs the mapping application to initiate a turn-by-turn navigation presentation to the predicted destination.

As mentioned above, the selection of the guidance option 340 in FIG. 3 directs the mapping application to initiate a turn-by-turn navigation presentation to this predicted destination. FIG. 6 illustrates this selection. Specifically, in a first stage 605, it shows the touch-selection of the guidance option 340. In response to this selection, the mapping application presents a turn-by-turn prompting navigation presentation, as shown by a second stage 610 of FIG. 6.

In some embodiments, during turn-by-turn prompting navigation, mapping application (1) tracks the position of the device with respect to a route that is being navigated to a particular destination, (2) provides updated information regarding this navigation (e.g., updated ETA, distance, and time information), and (3) provides an updated route to the particular destination with updated information about an updated route, after the device goes off the previously specified route to the particular destination. To perform these operations, the mapping application again uses the location-tracking services of the device and correlates this location to the location of the route that is being navigated and to the particular destination of the route. In turn-by-turn prompting navigation, the mapping application provides (1) a representation of the navigated route (e.g., a colored line that traverses a road network presented on a navigation map), (2) a representation of the device as it travels along the navigated route, and (3) navigation instructions regarding navigation maneuvers as the device approaches junctures along the navigated route at which a user may need to make decisions regarding the maneuvers.

The second stage 610 illustrates an example of navigation instructions. The instructions in this example include verbal instructions 615, graphical instructions 620 and text instructions 625. The graphical and text instructions are part of an overlay 630 that is presented over the map. In this example, the graphical instruction is a stylized arrow that is indicative of the maneuver to perform. The text instructions specify the distance (i.e., 0.1 miles) to the maneuver, the maneuver itself (i.e., right turn), and the street after the maneuver (i.e., State street). In some embodiments, the overlay 630 also includes data about the navigated route. In this example, this data include ETA, distance, and ETD for the destination.

The second stage 610 also shows that the UI 100 during turn-by-turn prompting navigation presentation includes a mute affordance 650, an Overview affordance 457 and an End affordance 455. As further described below, selection of the mute option 650 directs the application to turn off the voice-instructions for the maneuvers during the turn-by-turn navigation. The Overview and End affordances operate in the same manner as they do during the non-prompting navigation presentation, which was described above. The turn-by-turn navigation presentation, along with its affordances (e.g., mute, Overview and End affordances) will be further described below by reference to FIGS. 21-23.

Figure 7:
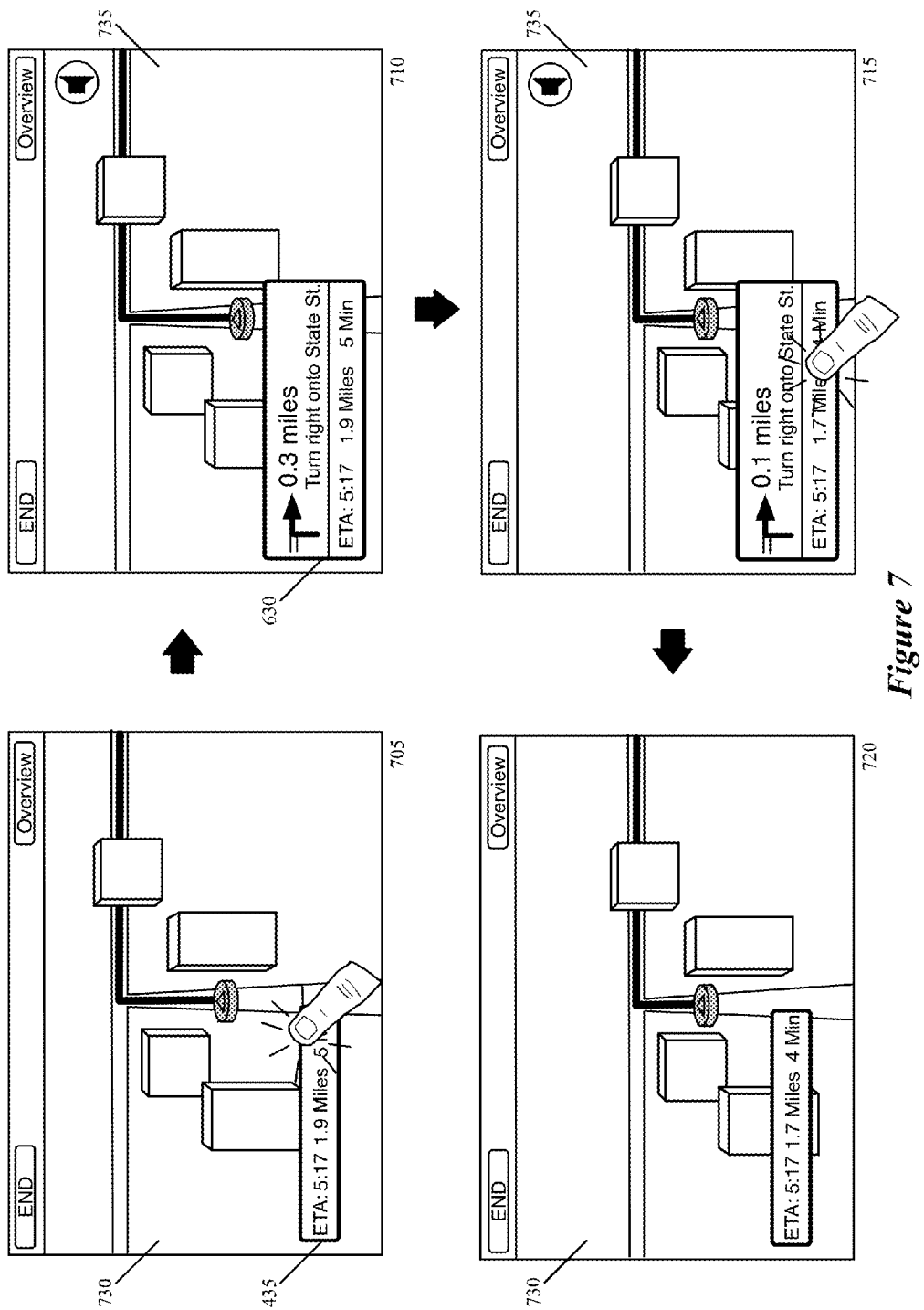
FIG. 7 illustrates a mechanism that the mapping application uses in some embodiments to quickly switch between turn-by-turn and non-prompting navigation modes.

FIG. 7 illustrates a mechanism that the mapping application uses in some embodiments to quickly switch between turn-by-turn and non-prompting navigation modes. This figure shows four operational stages 705-720 of the mapping application. These stages show that in some embodiments the mapping application switches between turn-by-turn and non-prompting navigation modes when the user selects the overlay displays that display information about the navigated route in these modes.

The first and second stages 705 and 710 show the mapping application switching from a non-prompting navigation presentation 730 to a turn-by-turn navigation presentation 735 after a touch-selection of the overlay display 435 of the non-prompting navigation presentation in the first stage 705. The third and fourth stages 715 and 720, on the other hand, show the mapping application switching from the turn-by-turn navigation presentation 735 to the non-prompting navigation presentation 730 after a touch-selection of the overlay display 630 of the turn-by-turn navigation presentation in the third stage 715.

Figure 8:
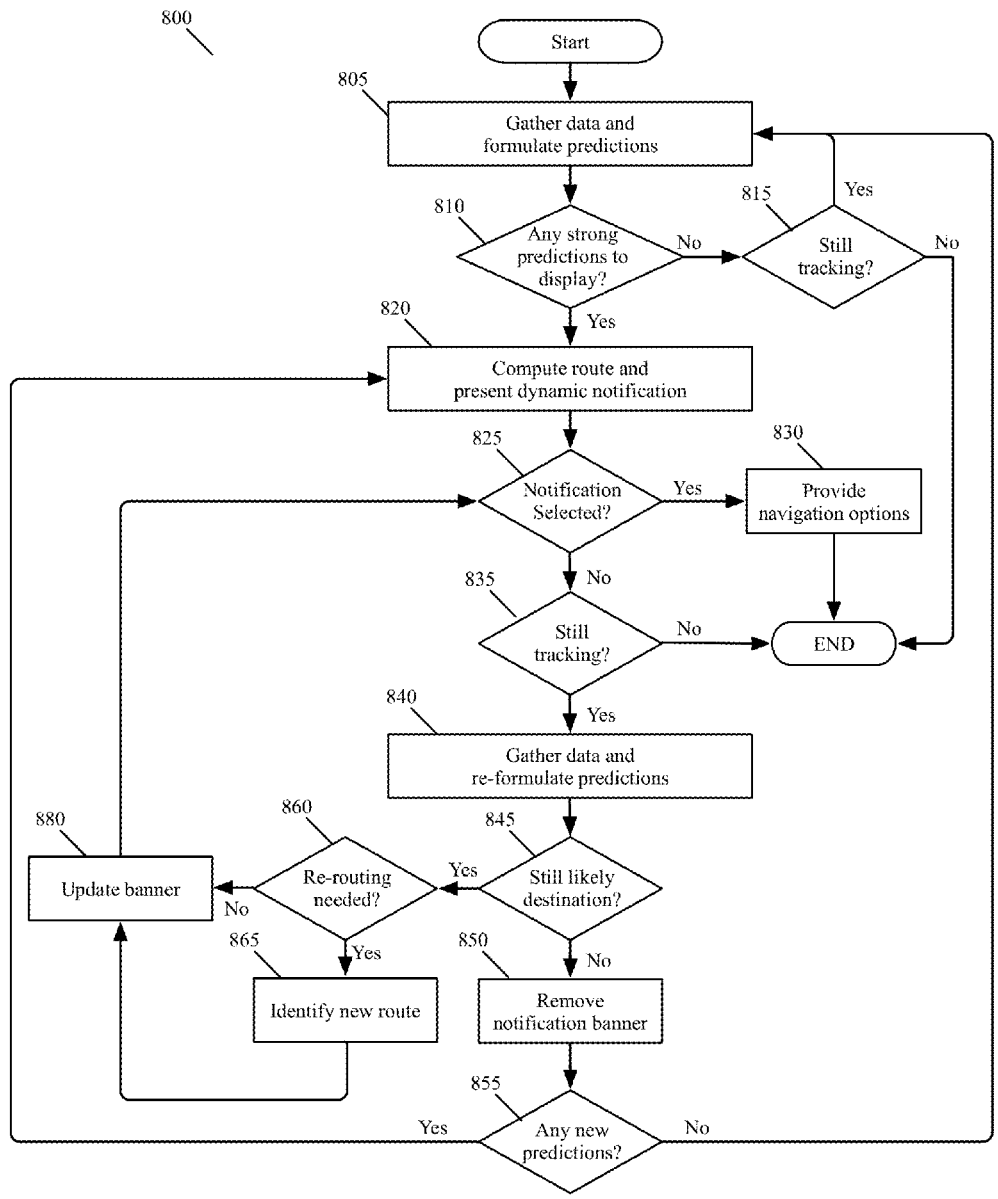
FIG. 8 conceptually illustrates a process that the mapping application of some embodiments performs to provide predicted-destination notifications in an automated manner without user intervention.

FIG. 8 illustrates a process 800 that the mapping application of some embodiments performs to provide predicted-destination notifications in an automated manner without user intervention. The process 800 is an automated tracking operation that tracks the location of the device, formulates predictions about the destination of the device, and provides notifications regarding these predictions. In some embodiments, the mapping application performs this process when it determines that it should start an automated tracking operation. The application makes this determination differently in different embodiments. In some embodiments, the application determines to start the automated tracking process 800 when it detects that the device has been connected (e.g., through a wired interface) to the electronic system of a vehicle, and that the application is currently presenting a default map page on a user interface of the vehicle electronic system. In these or other embodiments, the application starts the process 800 under different conditions (e.g., upon request by a user, by another application, etc.).

As shown in FIG. 8, the process 800 initially (at 805) gathers data and formulates predicted destinations for the device. The gathered data include different types of data in different embodiments. In some embodiments, the gathered data includes the time of day, the device's location, and prior identified locations at which the device previously resided for a sufficiently long duration of time (e.g., for thirty minutes). For each prior identified locations of the device, the mapping application of some embodiments defines and stores a region of interests (also called machine-generated region) that specifies the identified prior location in terms of one or more geometric constructs (e.g., a location and a radius).

To formulate its predicted destination (at 805), the process uses these machine-generated regions to compute in-state or out-of-state probabilities and then uses these probabilities to determine whether one such region should be specified as the current predicted destination. When the current location of the device falls within a particular region that is one of the stored destination regions, the process 800 of some embodiments tries to identify for the device one or more possible destination regions from the current location by computing the probability of transitioning from the particular region (that contains the current location) to each of the possible destination regions. This probability computation is an "in-state" probability analysis, because the current location of the device is within one of the machined-generated regions.

For each potential destination region, the in-state analysis in some embodiments expresses a conditional probability for transitioning from the device's current region to the potential destination region. In some embodiments, the mapping application stores different conditional probabilities for the same transition (i.e., the transition between two regions) at different time intervals. In other embodiments, the application does not store the conditional probabilities, but instead stores region parameters (e.g., attributes, such as ingress and egress transition times and statistics) that the process 800 uses to compute the conditional probabilities.

When the device's current location is not within a machined-generated region, the process 800 performs an out-of-state probability analysis. In this analysis, the process computes for each potential destination region, a probability for transitioning into the potential destination region. In some embodiments, this probability is based on the current time and other gathered data (e.g., the device's current location). In other embodiments, this probability is not conditioned on the device's current location. In some embodiments, the application stores different probabilities for transition into a region at different time intervals, while in other embodiments, the application stores parameters (e.g., attributes, such as ingress transition times and statistics) that the process 800 uses to compute the probabilities for transitioning into a region.

Some embodiments perform the in-state and out-of-state analysis differently. For instance, in some embodiments, this analysis depends on other factors, such as the direction of the device's travel or other gathered data. Also, in some embodiments, the process 800 performs an "in-state" probability analysis when device is currently between two machined-generated regions, so long as the current device location is along a path that the device typically takes between the two regions or is along a common path between the two regions. To determine whether the path is a typical path taken by the device, some embodiments store positional data (e.g., intermediate positional data as described below) for the transitions between two regions. To determine whether a path is a common path between two regions, different embodiments assess the "commonness" of the path differently. For instance, some embodiments determine whether the path is along a route that is returned by a routing service as the route between the two regions. When the device is between two stored regions but it is not along a typical or common path, the process 800 of some embodiments performs an "out-of-state" analysis as described above.

In some embodiments, the process 800 provides predicted-destination notifications for only prior identified locations of the device that are associated with machine-generated regions that the mapping application previously identified. However, in other embodiments, the notifications can be based on other locations identified by the mapping application. For instance, in addition to, or instead of, machine-generated regions, the process 800 in some embodiments formulates (at 805) possible destinations based on harvested address locations, such as locations of calendared events, locations associated with electronic tickets (e.g., concert tickets, plane tickets, train tickets, etc.) stored by the device, etc. For each possible destination that is based on a harvested address, the process 800 computes a probability or other score, so that it can rank this destination with the other possible destinations and perhaps select one of these destinations as the predicted destination.

After identifying possible destinations and formulating probabilities for these destinations at 805, the process 800 determines (at 810) whether it should select one of the identified destinations as a predicted destination for which it should provide a notification. In some embodiments, this selection is based on the probability values or scores derived from the probability values that were computed (at 805) for the identified destinations.

When the process determines (at 810) that the computed probabilities or scores for none of the identified destinations meet a required criteria (e.g., a required threshold probability value or score), the process determines (at 810) that it should not provide a predicted-destination notification for any of the locations identified at 805. In this situation, the process transitions to 815 to determine whether it should still perform its automated tracking operation. In some embodiments, the process terminates its tracking operation under a variety of circumstances. In some embodiments, these circumstances include the device being disconnected from the vehicle electronic system (e.g., from the wired connection to this system), the device reaching its destination, and the application presenting a page that does not display predicted-destination notifications. The process terminates its tracking operations for other reasons in some embodiments. When the process 800 determines (at 815) that it should terminate its tracking operation, it ends. Otherwise, it returns to 805 to gather more up-to-date information about the device's travel (e.g., its location, direction of travel, etc.), and to perform again its prediction computations based on the newly gathered data, and then transitions to 810 to determine whether it should provide a predicted-destination notification based on its new prediction computations.

When the process determines (at 810) that the computed probabilities or scores of at least of the identified destinations meet a required criteria (e.g., a required threshold probability value or score), the process selects (at 810) the best identified destination (e.g., the destination with the highest probability value or score) and then transitions to 820. At 820, the process identifies a route to the selected destination from the device's current location, and obtains or computes data for the device's travel to the destination along the identified route. In some embodiments, this data includes the ETA, distance, and ETD for the destination from the device's current location. In some embodiments, the process 800 uses a route-identifying service that operates on external servers (connected to the device through a communication network, such as a cellular phone network) to obtain a route and/or route information for the current location of the device and the location of the predicted destination. In some embodiments, such route information not only includes the distance, ETA and ETD information, but also includes traffic data. In other embodiments, the process 800 computes the route and generates some of the route data (e.g., distance to destination) but uses the data from external servers to identify other route data (e.g., traffic data).

After obtaining or computing the route data (at 820), the process 800 provides a dynamic predicted-destination notification for the destination selected at 810. One example of this notification is the notification 150 or 155. As mentioned above, such a notification provides various types of data regarding the predicted destination, and some of this data is dynamically updated by the process 800 as the device travels. As described above and further described below, the displayed data includes the distance and ETA to the destination and the estimate time of arrival at the destination from the device's current location.

After 820, the process determines (at 825) whether the predicted-destination notification was selected by the user. If so, the process provides (at 830) the navigation options 330, 335, and 340, which are described above by reference to FIGS. 3-6. After providing the navigation options at 830, the process ends, as the current automated tracking process has finished. In some embodiments, the mapping application performs the process 800 again when it returns to the map page on which such notifications are provided. However, in some embodiments, the mapping application does not repeat its automated tracking and notification process 800 when the user identifies (e.g., by selecting the Yes option 330) a predicted destination as the destination of the device and then terminates a navigation presentation to the destination. In such a situation, it is assumed that the user no longer wishes to receive notification and/or information regarding the predicted destination.

When the process determines (at 825) that the predicted-destination notification was not selected, the process determines (at 835) whether it should still perform its automated tracking operation. In some embodiments, the set of criteria for this determination (at 835) is similar or identical to the set of criteria for this determination (at 815). When the process determines (at 835) that it should no longer be performing its automated tracking operation, it ends. Otherwise, the process transitions to 840 to gather new data (e.g., the device's location, the current time, the direction of the device's travel, etc.) and re-formulates its predictions based on this new data. In re-formulating its predictions, the process computes probabilities for each possible destination that it examines based on the newly gathered data. In some embodiments, these computations are similar to the computations described above for 805. Also, additional details regarding how the mapping application formulates and selects a prediction destination in some embodiments can be found in U.S. patent application Ser. No. 14/081,895, now issued as U.S. Pat. No. 9,303,997, 14/020,689, now issued as U.S. Pat. No. 9,267,805, and 14/022,099, now published as U.S. Patent Publication 2014/0364150. These three applications (Ser. Nos. 14/081,895, 14/020,689 and 14/022,099) are incorporated herein by reference.

Next, at 845, the process determines whether the current predicted destination (i.e., the destination that is identified by the notification banner presented at 820) is still the likely-destination of the device. If not, the process removes (at 850) the notification banner for the current predicted destination, e.g., removes the banner 150 as shown in the third stage 115 of FIG. 1. In some embodiments, the process may determine that the current predicted destination is no longer the likely destination when the device travels a sufficiently large distance away from the destination and/or repeatedly traverses off routes to this destination that the process iteratively identifies. More generally, in some embodiments, the newly gathered data at 840 may result in the probability value or score of the current predicted destination dropping such that this value or score no longer meets the required set of criteria that it has to satisfy for the destination to server as the predicted destination. In some cases, the newly gathered data may make the current predicted destination a less probable destination than one or more other possible destinations.

After 850, the process determines (at 855) whether it should identify a new destination as the predicted destination. If not, it returns to 805 to resume its data gathering and prediction formulating operations. Otherwise, when the process determines (at 855) that it should identify a new destination as the predicted destination based on the data gathered and computation performed at 840, the process transitions to 820 to identify a route to the newly predicted destination, to identify data for this route, and to present a dynamic predicted-destination notification for the newly predicted destination.

When the process determines (at 845) that the currently predicted destination should still be the predicted destination (e.g., it is still the best viable destination), the process determines (at 860) whether it should identify a new route to the destination. If not, the process transitions to 880, which will be described below. If so, the process identifies (at 865) a new route to the predicted destination, and then transitions to 880. At 880, the process then identifies new travel data for the predicted destination and update the predicted-destination notification if necessary based on the newly identified travel data. In some embodiments, the identified travel data includes ETA data, distance data, ETD data, traffic data, etc. One example of updating the predicted-destination notification was described above by reference to FIG. 2.

Figure 9:
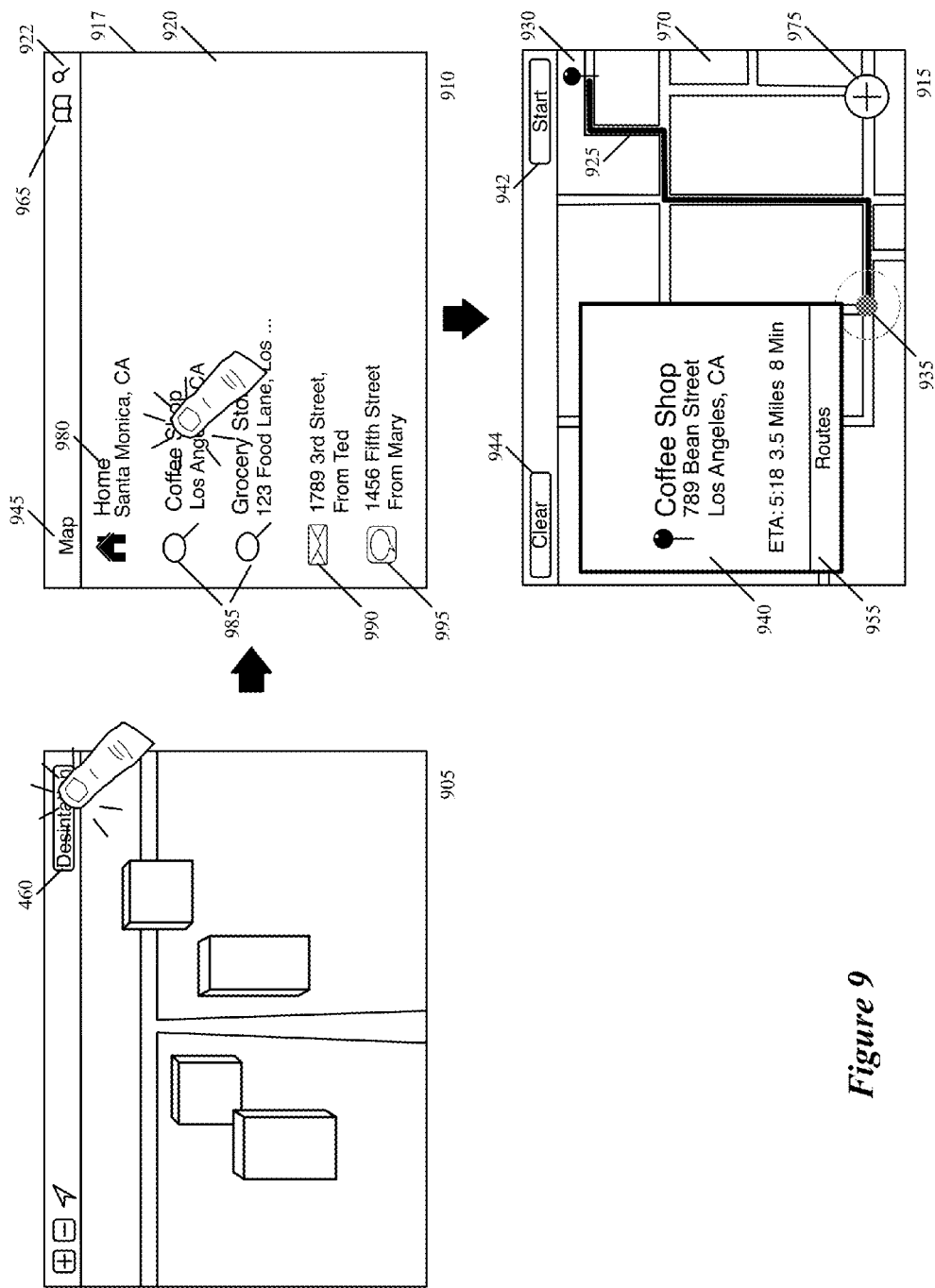
FIG. 9 illustrates the mapping application of some embodiments that has a destination page that lists one or more predicted destinations for the device at any given time.

The mapping application of some embodiments provides predicted destination through other UI constructs instead of, or in conjunction with, the dynamic predicted-destination notifications 150. For instance, as shown in FIG. 9, the mapping application in some embodiments has a destination page that lists one or more predicted destinations for the device at any given time. FIG. 9 presents an example that is shown in three operational stages 905-915 of the UI 100.

The first operational stage 905 shows the selection of the Destination affordance 460 on a page that displays the map. This selection directs the application to present a destination page 917 that is shown in the second operational stage 910. The destination page 917 includes a Search affordance 922 for directing the application to present a search page for receiving a search request, as further described below by reference to FIG. 11.

The destination page 917 also displays a list 920 of predicted destinations. In some embodiments, this list includes (1) destinations that are machine-generated from the previous locations of the device or a user of the device, (2) addresses that are harvested from telecom messages (e.g., e-mails, text messages, etc.), calendar events, calendar invites, electronic tickets, or other electronic documents, and (3) searches that are made through the mapping application. Formulating predicted destinations from all these sources is described further in U.S. patent application Ser. Nos. 14/081,895 and 14/081,843, now published as U.S. Patent Publication 2014/0365459, which are incorporated herein by reference. In some embodiments, the predicted destination list 920 does not include all these types of predicted destinations and/or includes other types of predicted destinations. For example, in some embodiments, the predicted destinations include other destinations that are derived or extracted from other devices of a user, with these other destinations being communicated to the mobile device of the mapping application through cloud or network services that communicatively connect the user's devices.

In the example illustrated in FIG. 9, the predicted-destination list 920 displays five predicted destinations and a graphical indicator next to each predicted destination to indicate the source from which the destination was derived or extracted. In this example, the indicator 980 specifies that the first destination in the list is the user's home address, which is a machine-generated destination in some embodiments. The indicators 985 specify that the second and third destinations are results of searches performed through the mapping application, while the indicators 990 and 995 specify that the fourth and fifth address on the list are extracted respectively from an email message and a text message. Also, below the fourth and fifth address the name of a person appears (e.g., Ted for the fourth address and Mary for the fifth address). These names identify the senders of the messages (e.g., the email for the fourth address and the text message for the fifth address) from which the addresses were extracted.

In some embodiments, some or all of the predicted destinations in the predicted-destination list 920 are sorted according an order that is specified based on ranking scores. For instance, in some embodiments, the application places the most-likely machine-generated destination as the first destination on the list 920, and then sorts the remaining predicted destinations (e.g., the other machine-generated destinations, the harvested addresses, and/or searched addresses) in the list 920 based on ranking scores that the application computes for the different destinations. In other embodiments, the application computes ranking scores for all of the predicted destinations and presents all the destinations according to the computed rankings In some embodiments, the ranking score is based on how frequently the address location was used and how recently it was used. These two factors are used in some embodiments to compute a Recency score that is used to rank some of the addresses shown on the destination list. The use of Recency scores is further described in U.S. patent application Ser. No. 14/081,843.

The second stage 910 also shows a Map affordance 945 and a bookmark affordance 965. The selection of the Map affordance 945 on the destination page causes the application to transition back to the map page illustrated in the first stage 905. Selection of the bookmark affordance 965 directs the application to present a list of bookmark entries. In some embodiments, a user can bookmark locations on the map through the bookmark affordance 965. For each bookmarked location, the bookmark affordance creates an entry in a bookmark list in some embodiments. A user can access a bookmarked location by selecting the entry created for the bookmarked location in the bookmark list.

The second stage 910 shows the selection of the second predicted destination on the list 920. This destination is a coffee shop. As shown by the third stage 915, this selection directs the application to present a route overview page 970. This page displays the current location 935 of the device, the destination 930 selected in the second stage 910, and a route 925 between the current location 935 and the destination 930. The route-preview page 970 also includes Start and Clear affordances 942 and 944 that, in some embodiments, direct the application respectively to start a turn-by-turn navigation to the displayed destination and to remove the route-preview features and return to the original presentation of the map in the first stage 905.

The route-preview page 970 also includes an information display area 940 that displays information about the selected destination. In this example, this information includes the name of the destination (Bettie's coffee shop), the address of the destination, and route data for (e.g., ETA, distance, and ETD) this destination. The information display area 940 also includes (1) a route-selection affordance 955 for directing the application to provide in the route overview page 970 other routes to the selected destination, and (2) a modal zoom affordance 975 for directing the application to zoom to the selected destination or zoom out to an overview of the route 925.

Figure 10:
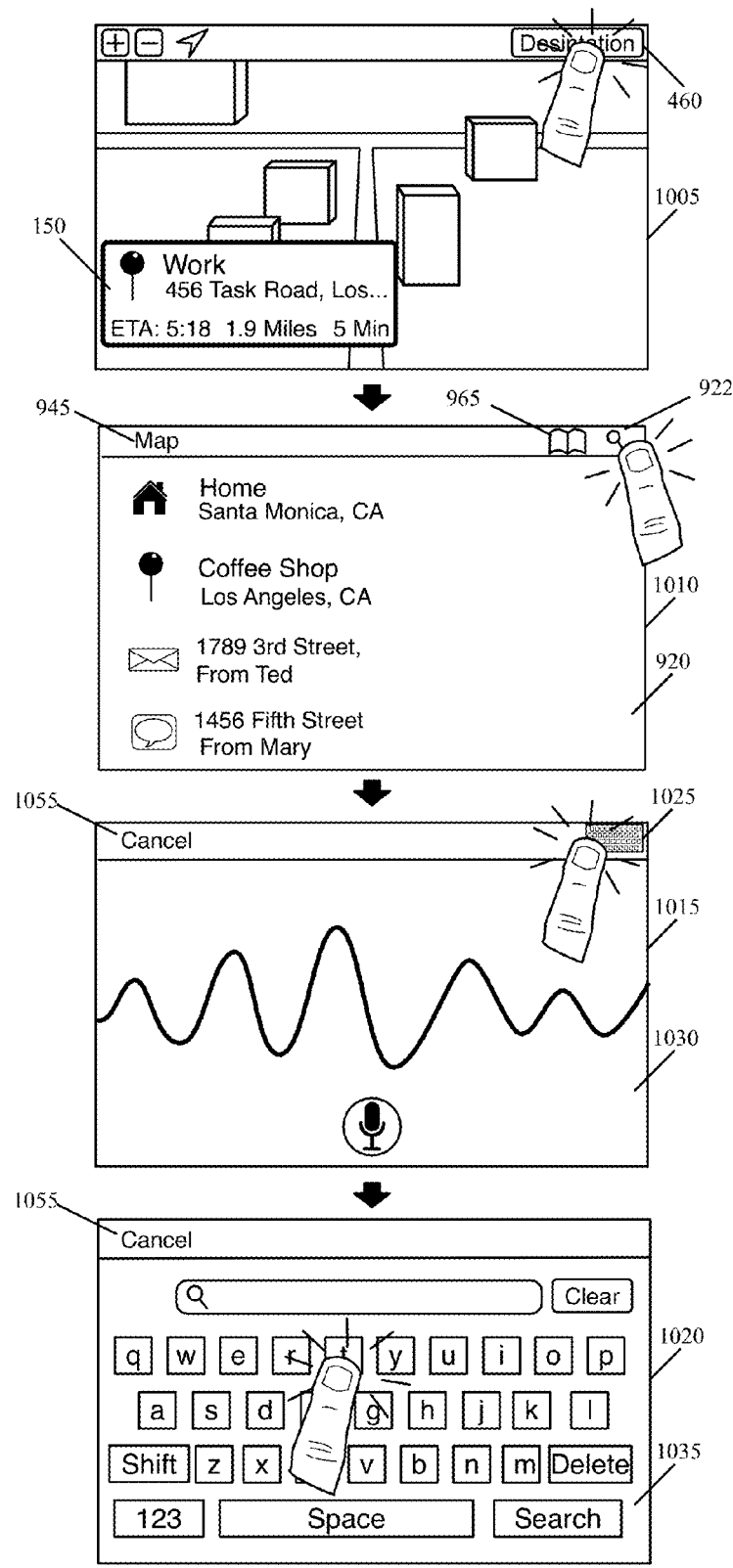
FIG. 10 provides a destination page that is part of a sequence of pages that progressively provide additional location input methods that require increased levels of user interaction to specify a location.

FIG. 10 illustrates that, in some embodiments, the destination page 917 is part of a sequence of pages that progressively provide additional location input methods that require increased levels of user interaction to specify a location. Specifically, the mapping application of some embodiments provides a variety of UI elements for allowing a user to specify a location (e.g., to view or to serve as route destinations). In some embodiments, these location-input UI elements appear in succession on a sequence of pages 1005-1020, according to a hierarchy that has the UI elements that require less user interaction appear on earlier pages in the sequence than the UI elements that require more user interaction.

In some embodiments, the location-input UI elements that successively appear in the mapping application include (1) predicted-destination notifications 150, (2) a list 920 of predicted destinations, (3) a voice-based search affordance 1030, and (4) a keyboard 1035. In some of these embodiments, these UI elements appear successively on the following sequence of pages: (1) a default page 1005 for presenting the dynamic selectable notifications, (2) a destination page 1010 for presenting the list of predicted destinations, (3) a search page 1015 for receiving voice-based search requests, and (4) a keyboard page 1020 for receiving character input.

More specifically, in some embodiments, the default page 1005 of the mapping application provides notifications 150 of machine-generated predicted destinations and allows these notifications to be selected to obtain navigation options to the predicted destination. This page 1005 also includes the Destination affordance 460 that, when selected, directs the application to present the destination page 1010.

Once presented, the destination page 1010 provides the predicted-destination list 920, along with the Search affordance 922 and a bookmark affordance 965. Selection of the Search affordance 922 on the destination page 1010 directs the application to present the search page 1015, which will be described below. Selection of the bookmark affordance 965 directs the application to present the list of bookmark entries, as described above. In some embodiments, the bookmark affordance is only accessible through the destination page 1010, as these embodiments have the bookmark list accessible in the location-input hierarchy at the same level as the voice-based search. In other embodiments, the mapping application presents the bookmark affordance on other pages, such as the default map page 1005.

The search page 1015 includes a voice-based search affordance 1030 and a selectable keyboard affordance 1025. Selection of the voice-based search affordance 1030 directs the application to process a voice-based search. Selection of the selectable keyboard affordance 1025 directs the application to present the keyboard page 1035 that displays a keyboard through which a user can provide a series of character inputs that are to serve as a search string for a search query.

The search page 1015 and the keyboard page 1035 also display Cancel controls 1055. When these controls are selected, the application returns back to the destination page 1010. The destination page 1010 displays the Map control 945, which, as mentioned above, directs the application to return to the map page 1005 when it is selected.

Figure 11:
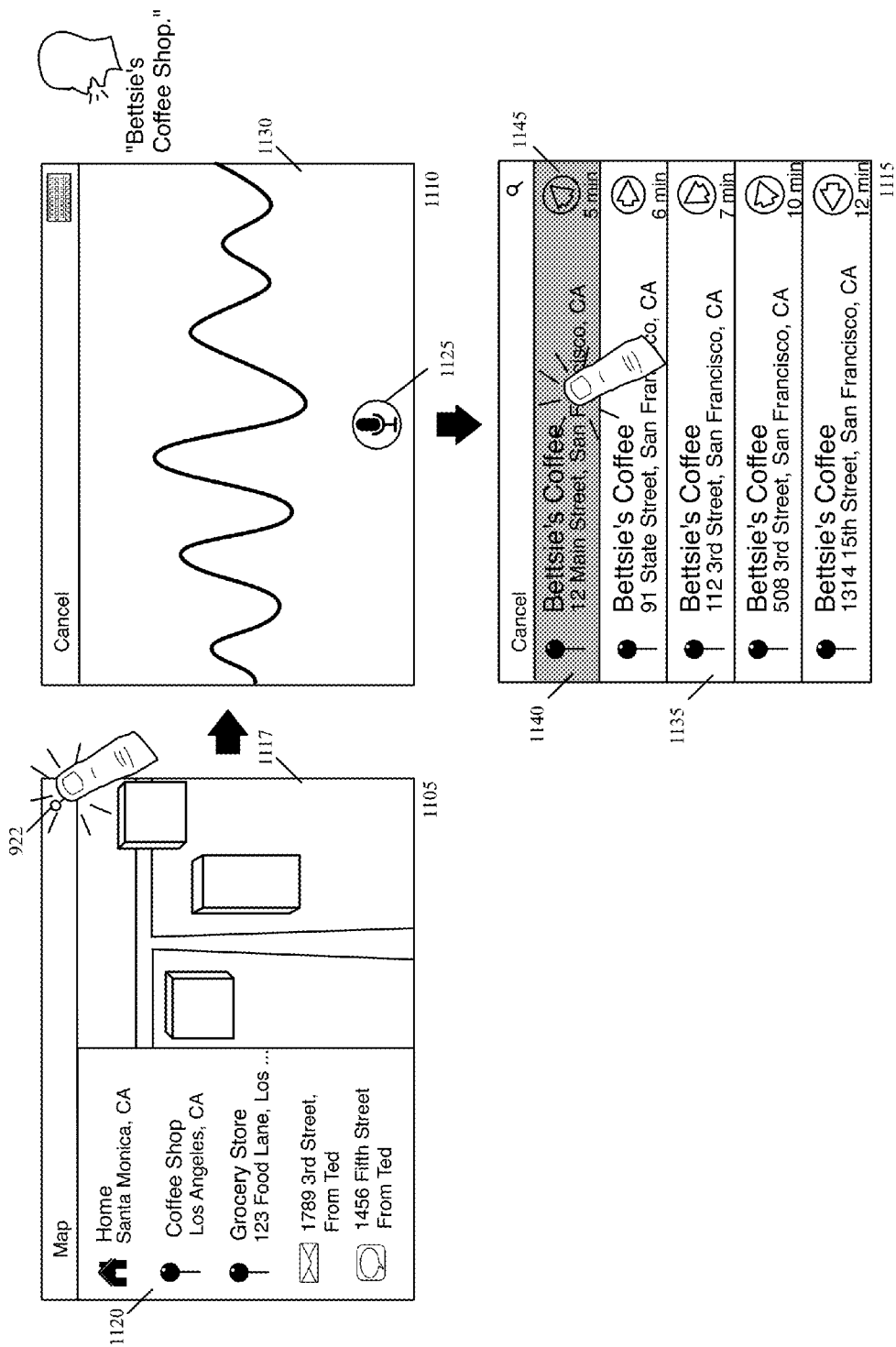
FIG. 11 presents an example that illustrates the voice-search interface of the user interface (UI) of some embodiments.

FIG. 11 presents an example that illustrates the voice-search interface of the UI 100 of some embodiments. This example is illustrated in terms of three operational stages 1105, 1110, and 1115 of the UI 100. The first operational stage 1105 shows the selection of the search affordance 922 on a destination page 1117. The destination page 1117 has a slightly different layout than the destination page 917 that was described above by reference to FIGS. 9 and 10. Both pages 917 and 1117 provide a list of predicted destinations 920 or 1120. But this list on page 917 completely covers the map that was presented on the default page 1005 before the selection of the destination affordance 460, whereas it covers only part of this map on page 1117 (i.e., on page 1117, it is presented in an overlay display that only partially covers the map).

The first stage 1105 shows the selection of the search affordance 922. As shown in the second stage 1110, this selection results in the display of the search page 1015, which includes a search initiate affordance 1125. In some embodiments, when the application presents the search page, the application is immediately ready to receive voice-based search request (as indicated by fluctuating graph 1130). The application in some embodiments listens for voice instructions, and when it determines that it has received a discrete voice command, performs a search based on the discrete voice command (as indicates by the graph 1130, which disappear or stops fluctuating). In these or other embodiments, the user provides a voice command, and then presses the search initiation affordance 1125 to direct the application to perform a search.

In other embodiments, when the application presents the search page, the application is not immediately ready to receive voice-based search request (e.g., as indicated by graph 1130, which does not fluctuate). In these embodiments, the user has to select the search initiation affordance 1125 to direct the application to start to listen for a voice command. In some of these embodiments, the application then starts a voice-based search, when it detects that it has received a discrete voice command, or when it detects that the user has selected the search initiation affordance 1125 again.

The second stage 1110 shows the user asking for "Bettsie's Coffee Shop." As shown, the application provides a search result page 1135 that lists different Bettsie's Coffee Shops in San Francisco. For each shop, this list provides a name, an address, and a directional arrow 1140. Each search result's directional arrow is aligned with a straight-line direction to the search result from the current location of the mobile device that executes the mapping application. For the direction of the arrow, the direction that the device is traveling needs to be identified. When the device is connected to a vehicle that has provides compass data, the direction of the device's travel is obtained in some embodiments from the compass data of the vehicle. On the other hand, when the device is not connected to a vehicle that provides compass data, the direction of the device's travel is derived in some embodiments from successive past detected locations of the device.

As the device travel, the directional arrows 1145 rotate to align with the current straight-line direction to the search result and the current direction of travel of the device. Also, as shown in the second stage 1110, the search result list displays a duration of time below each directional arrow of each search result. This duration of time is the time to reach the search result from the current location of the device. Instead of this time metric, other embodiments display other time or distance metrics below the search arrow or at another location for each search result. For instance, in some embodiments, an ETA and/or distance is provided below each search result's arrow instead of or in conjunction with the ETD data.

The third stage 1115 shows the selection of one of the coffee shops in the displayed search result list. As further described below by reference to FIG. 14, this selection directs the application to present a route-preview page that displays a selected location (selected search result in this example) on a map, a route to the selected location from the current location of the device, and an information display area that displays information about the selected location.

Figure 12:
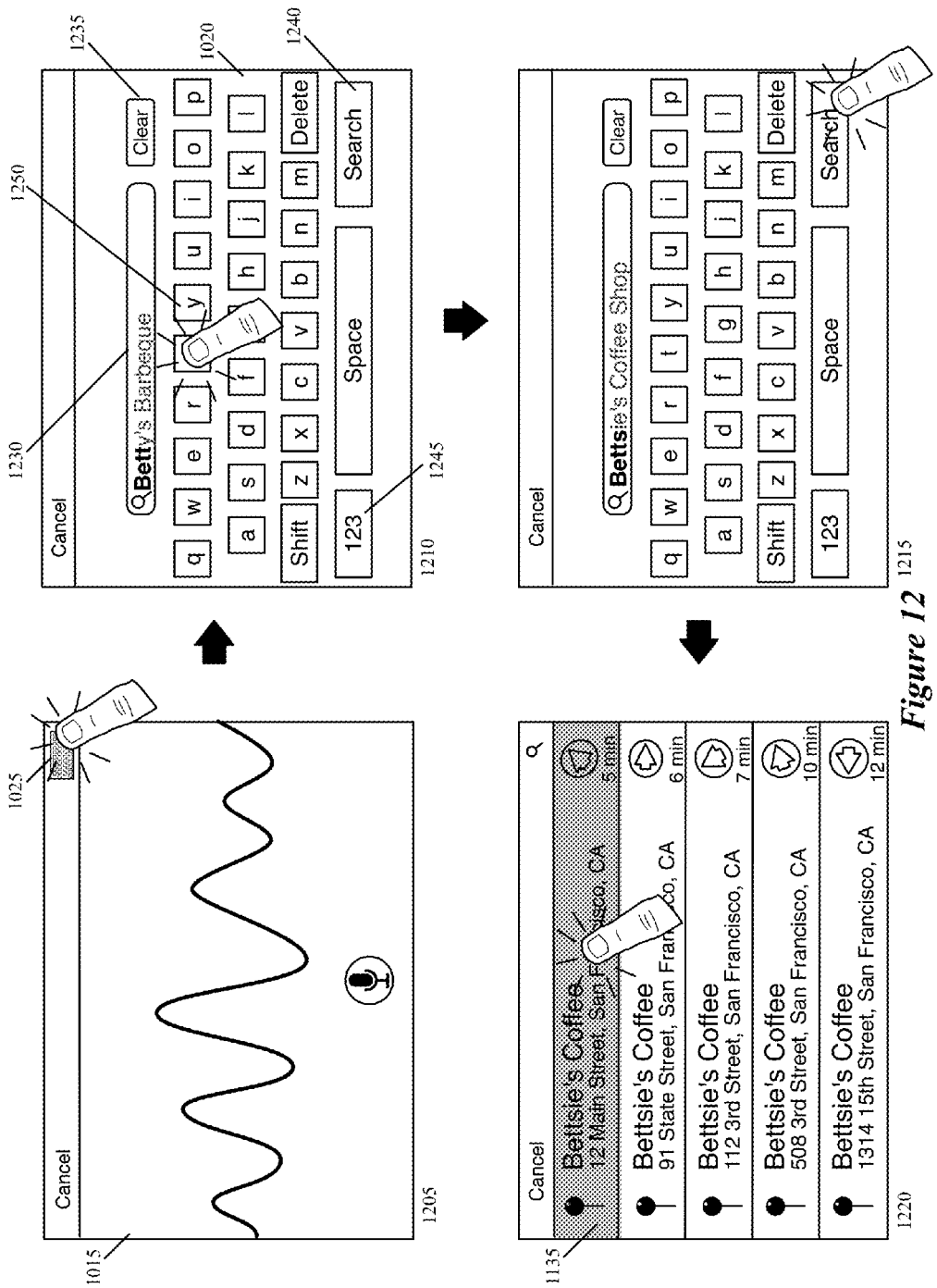
FIG. 12 presents an example that illustrates the character search interface of the UI of some embodiments.

FIG. 12 presents an example that illustrates the character search interface of the UI 100 of some embodiments. This example is illustrated in terms of four operational stages 1205, 1210, 1215 and 1220 of the UI 100. The first operational stage 1205 shows the selection of the keyboard affordance 1025 on the search page 1015. As shown, this selection directs the application to present the keyboard page 1020 in the second stage 1210.

As shown in the second operational stage 1210, the keyboard page 1020 includes several selectable characters 1250 arranged in a QWERTY keyboard layout, other keyboard keys (such as Delete, Shift, Space, etc.), special search inputs (such as Search, Cancel, 123), and a display area 1230. The Cancel input 1210 is to remove the keyboard page 1020 and go back to one of the previous pages, which is a different page in different embodiments. For instance, the previous page is the search page 1015 in some embodiments, while it is the default map page 1005 in other embodiments. The Search input 1240 is to direct the application to perform a search for a string specified in the display area 1230. The 123 input 1245 is to direct the application to replace some or all of the text characters with numbers on the keyboard page 1020.

The second operational stage 1210 shows the selection of a character "t." As shown, this selection is the second "t" in a received search string "Bett." Also, as shown, this search string has caused the application to auto populate the display area with the predicted search string "Betty's Barbeque." In the third operational stage 1215, the received search string is "Betts" and the application has predicted the search query "Bettsie's Coffee Shop" and displayed this prediction in the display area 1230.

The third operational stage 1215 also shows the user selecting the Search input 1240. In response, the application (as shown in the fourth operational stage 1220) displays the search result page 1135, which is identical to this page on FIG. 11, as it is based on the same received search query. The fourth operational stage 1220 also shows the selection of the first search result 1140. The selection of the search result 1140 in FIG. 11 or 12 directs the application to present a route-preview page.

Figure 13:
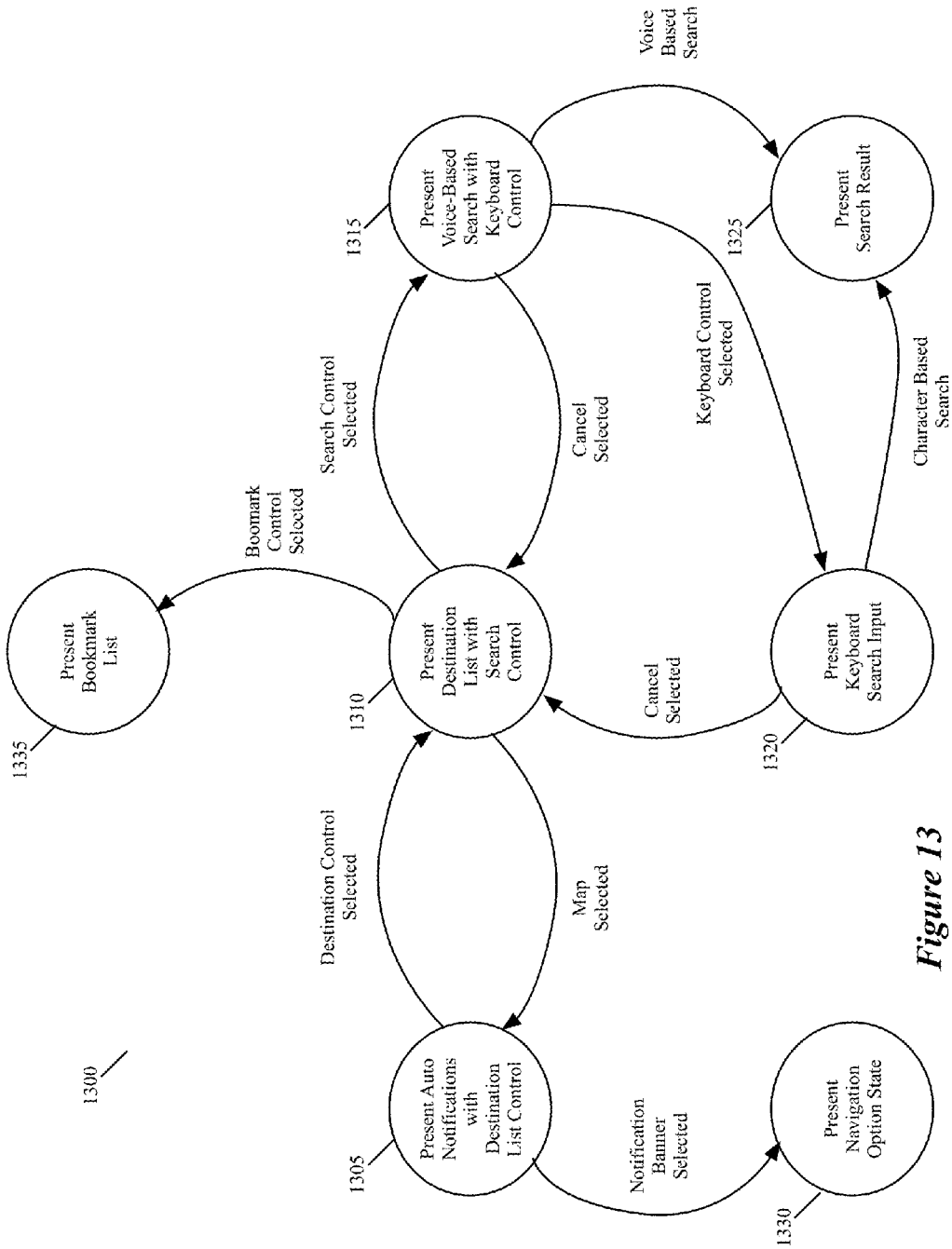
FIG. 13 presents a state diagram that illustrates how the mapping application hierarchically organizes pages that provide progressively additional location-input affordances that require increased levels of user interaction to specify a location.

FIG. 13 presents a state diagram 1300 that illustrates how the mapping application hierarchically organizes pages that provide progressively additional location-input affordances that require increased levels of user interaction to specify a location. This diagram illustrates six states 1305-1335 that correspond to seven pages of the map application that were described above. In each of these state, the operations of the mapping application is controlled by one or more application processes that are responsible for the user interaction on the pages associated with these states.

These seven states are (1) the auto notification state 1305 corresponding to the default map page 1005, (2) the destination list state 1310 corresponding to the destination list page 1010, (3) the voice-based search state 1315 corresponding to the voice-based search page 1015, (4) the keyboard state 1320 corresponding to the keyboard page 1020, (5) the search result state 1325 corresponding to search result page 1135, (6) the navigation option state 1330 corresponding to the navigation option page such as the page illustrated in the second stage 310 of FIGS. 3, and (7) a bookmark list state 1335 corresponding to a bookmark page (not shown) that displays a list of bookmarked entries.

As shown in FIG. 13, the auto notification state presents the default map page 1005, which provides notifications 150 of machine-generated predicted destinations and allows these notifications to be selected to obtain navigation options to the predicted destination. Selection of a displayed notification causes the application to transition to the navigation option state 1330 to present navigation options with respect to the predicted destination that was subject of the selected notification. The auto-notification page 1005 also displays the Destination affordance 460. When this affordance is selected, the application transitions to the destination list state 1310, which presents the destination page 1010. Once presented, the destination page 1010 provides the predicted-destination list 920, along with the Search affordance 922 and the bookmark affordance 965.

Selection of the bookmark affordance 965 directs the application to transition to the bookmark state 1335 to present a list of bookmark entries. On the other hand, selection of a destination on the destination list of the destination page 1010 causes the application to transition to a route-preview state (not shown) that presents a route-overview page, such as page 970 of FIG. 9. On the other hand, selection of the Search affordance 922 on the destination page 1010 causes the application to transition to the voice-based search state 1315, which presents the search page 1015 that includes a voice-based search affordance 1030 and a selectable keyboard affordance 1025. Selection of the voice-based search affordance 1030 causes the application to process a voice-based search and then transition to the search result state 1325 to show the search results. Selection of the selectable keyboard affordance 1025, on the other hand, causes the application to transition to the keyboard state 1320 to present the keyboard page 1035. This page 1035 displays a keyboard through which a user can provide a series of character inputs that are to serve as a search string for a search query. Input of a character based search causes the application to transition to the search result state 1325 to view the search result page. The search result page 1135 provides a list of search results. When one of the search results are selected, the process transitions to a route-preview state that provides a route-preview page, such as page 1400 that will be described below by reference to FIG. 14.

The state diagram 1300 also illustrates several examples of the application transitioning from later states back to earlier states. For instance, it shows that the selection of the Map affordance 945 on the destination page causes the application to transition from the destination list state 1310 back to the auto-notification state 1305. It also shows the application transitioning back to the destination list state 1310 (1) from the voice-based search state 1315 after the selection of the Cancel control 1055 on the voice-based search page 1015, and (2) from the keyboard search state 1320 after the selection of the Cancel control 1055 on the keyboard search page 1020.

The state diagram 1300 does not illustrate transitions out of the bookmark state 1335, search result state 1325 or the navigation option state 1330 because these transitions are not salient to the purpose of FIG. 13. This figure is provided to illustrate the sequence of location-input states 1305, 1310, 1315, and 1320 of the mapping application of some embodiments, the transitions through these states, and the progression of location-input mechanisms that are provided in these states. As shown by these states, the location-input UI mechanisms that successively appear in the mapping application include (1) predicted-destination notifications 150, (2) predicted destinations in a list, (3) a voice-based search, and (4) a keyboard based search. As shown, these UI elements appear successively on the following sequence of pages: (1) a default page 1005 for presenting the dynamic selectable notifications and a destination-list control, (2) a destination page 1010 for presenting the list of predicted destinations and a voice-based search control, (3) a search page 1015 for receiving voice-based search requests and for presenting a keyboard search control, and (4) a keyboard page 1020 for receiving character-based search queries. As mentioned above, the bookmark control 965 is also presented in some embodiments at the same level as the voice-based search tool, so that the bookmark list can appear at the same level of the page hierarchy as the voice-based search page.

Figure 14:
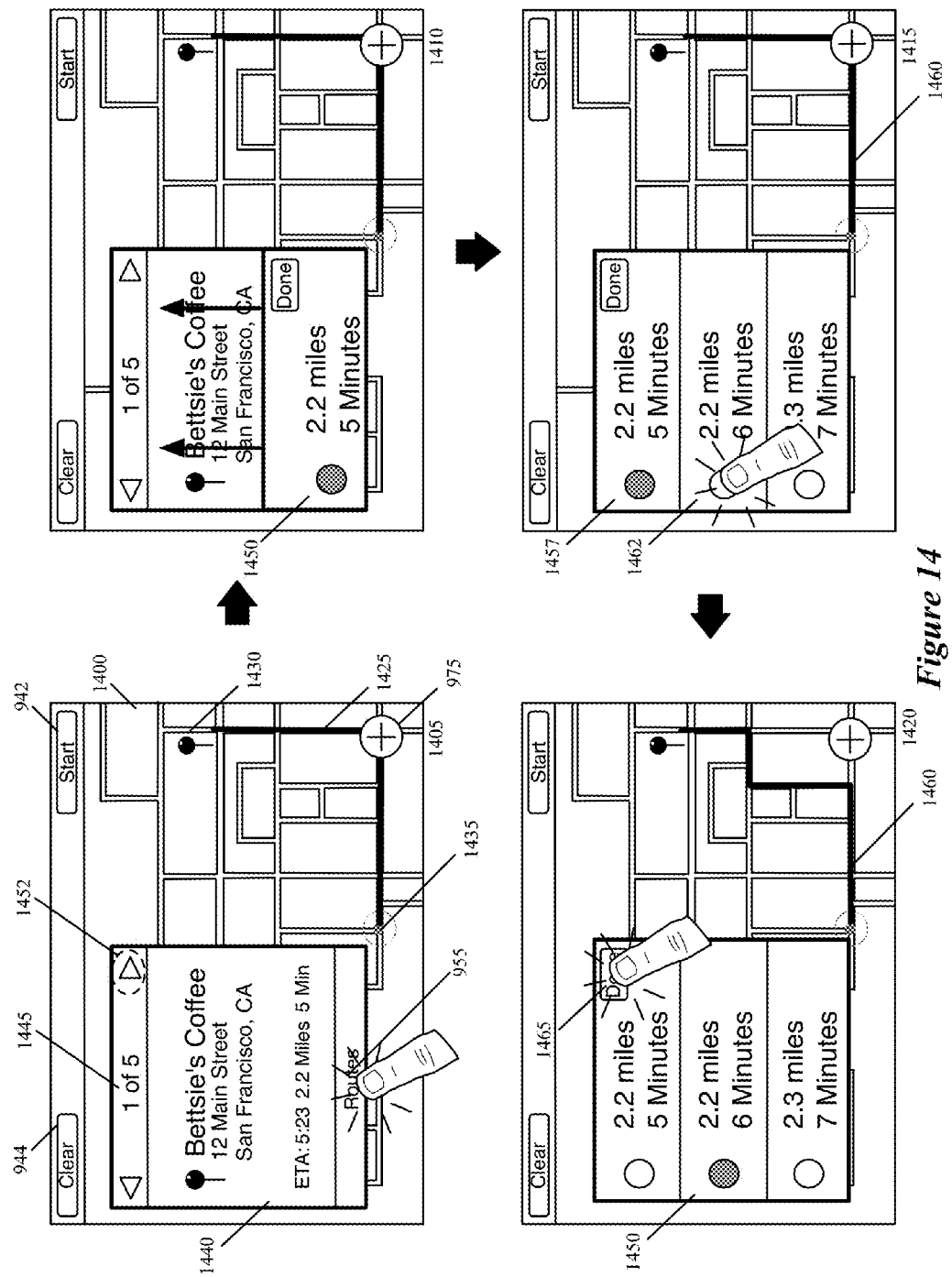
FIG. 14 illustrates a route-preview page of some embodiments.

FIG. 14 illustrates a route-preview page 1400 of some embodiments of the invention. In some embodiments, the mapping application presents this page 1400 after the user selects the search result 1140 in FIG. 11 or 12. As shown, the route-preview page displays the current location 1435 of the device, the location 1430 of the selected search result, and a route 1425 from the current location 1435 to the search result 1430. The route-preview page 1400 also includes the Start and Clear affordances 942 and 944, the information display area 1440, the route-selection affordance 955, the location-selection arrows 1452, and the modal zoom affordance 975. The Start and Clear affordances 942 and 944 were described above.

The information display area 1440 displays information about the selected search result and the route to this result. In this example, this information includes the name of the destination (Bettie's Coffee shop), the address of the destination, route data for (e.g., ETA, distance, and ETD) this destination, and the location 1445 of the selected destination on the search result list 1135. The information display area 1440 also includes (1) the route-selection affordance 955 for directing the application to provide in the route overview page 1400 other routes to the selected destination, and (2) the location-selection arrows 1452 for directing the application to step through other destinations that were originally presented in the search result list 1135 and to display routes to these other destinations. In addition to these controls, the route-preview page 1400 includes the modal zoom affordance 975 that directs the application to zoom to the selected destination or zoom out to an overview of the route. These three tools 955, 1452 and 975 allow a user to quickly explore the two-dimensional solution space of possible locations and possible routes to the locations. FIGS. 14-18 illustrate different operations of these three tools, while FIG. 19 illustrates an example of a user utilizing all three tools together to explore the two-dimensional solution space of possible locations and possible routes to the locations.

FIG. 14 presents an example that illustrates the route-selection affordance 955 of the information display area 1440 of some embodiments. This example is illustrated in four operations stages 1405-1420. The first stage 1405 shows the route-preview page 1400 that the application initially presents after the user selects the search result 1140 in FIG. 11 or 12. This stage 1405 also shows the selection of the route-selection affordance 955. As shown in the second and third stages 1410 and 1415, this selection causes an animation to be presented, which expands the height of the info-display area 1440 and replaces the content of the info-display area with a list 1450 of selectable routes to the destination of the current route. In this example, this animation moves the list of selectable routes from the bottom of the display area 1440 to the top of this display area.

The route list 1450 includes an identifier and information for each of several routes to the current destination (e.g., a selected search result or destination). In different embodiments, the route list 1450 includes different identifiers and/or provides different information for the routes. In the example illustrated in FIG. 14, each route is represented as a selectable circle, and the information for each route includes the distance and ETD data for the destination if that route is taken to the destination. Other embodiments will use other identifiers (e.g., miniature representations of the route, etc.) and provide other information (e.g., traffic congestion) for the routes on the route list 1450. Also, other embodiments will provide other animations (including no animation) for presenting the route list 1450, and/or other layouts for this list.

In the route list 1450, the currently displayed route 1425 is the first route 1457 on the list, as shown in the second and third stages 1410 and 1415. The third stage 1415 shows the selection of the identifier 1462 of a second route to the current destination. This selection causes the map that is displayed in the route overview page 1400 to display a new route 1460 to the current destination. Accordingly, through the route-selection affordance 955 and the route list 1450, the user can examine different routes to the current destination.

When the user no longer needs to examine different routes, the user can select a Done affordance 1465 on the route list to return to the default route-preview page, which is similar to the page shown in the first stage 1405, except now the information display area 1440 displays information about the selected second route 1460. In some embodiments, the route-preview page 1400 does not display the Done control 1465. For instance, in some embodiments, selection of any route representation on the route list 1450, directs the application to show the selected route on the route-preview page, and replaces the display of the route list in the information display area 1440 with information about the newly selected route.

Figure 15:
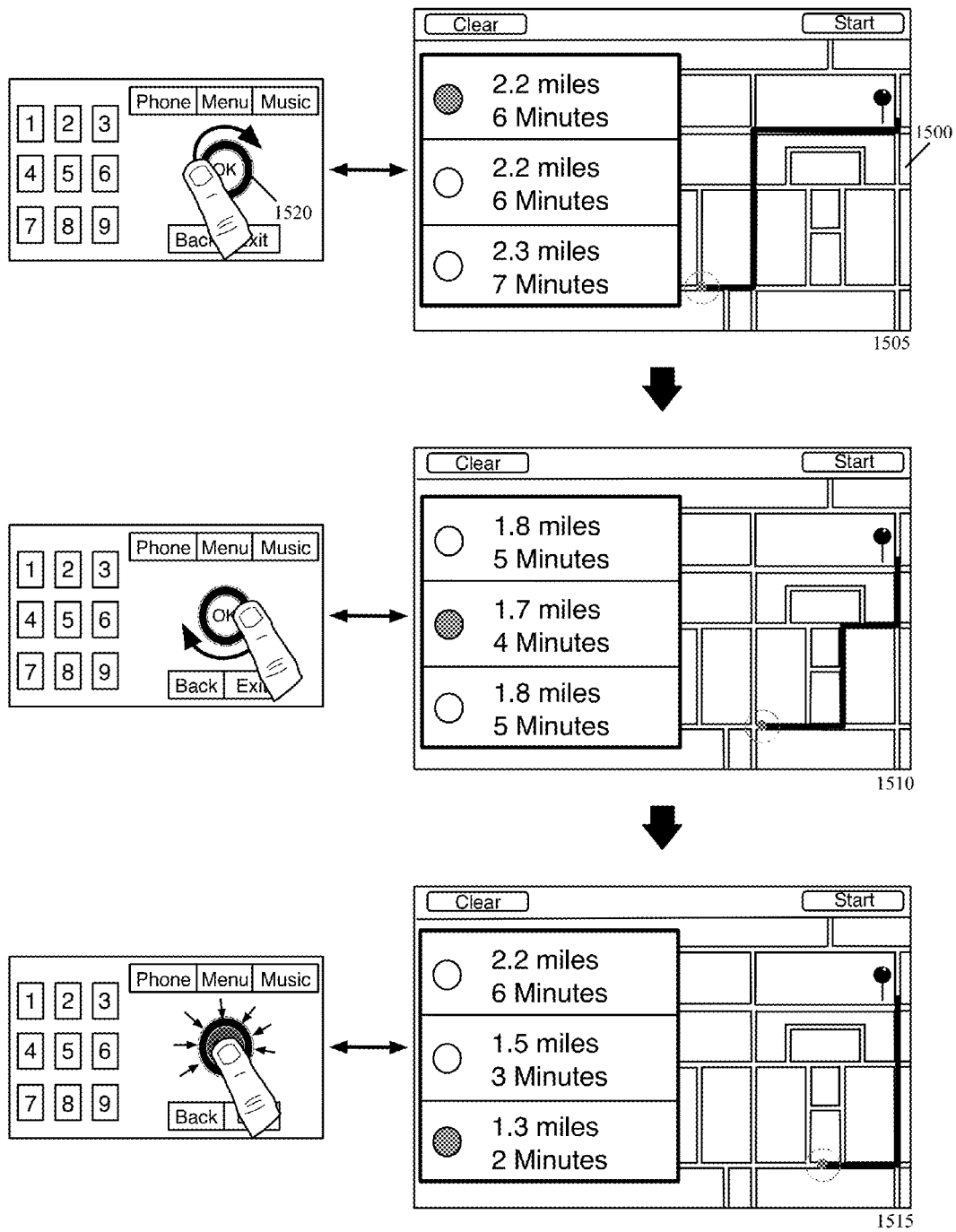
FIG. 15 provides an example of the route list without the "Done" control.

FIG. 15 illustrates an example of the route list 1450 without the Done control 1465. In three stages 1505-1515, this example shows a user interacting with this list through a cursor-controlling knob interface 1520 of a vehicle. In this example, the user rotates the knob to initially select different route identifiers on the route list. As different route identifiers are initially selected, the route-preview page 1400 displays the associated route on the map (e.g., the second stage 1510 shows a second route, while the third stage 1515 shows a third route). When the user wants to finalize a selection of one of the routes, the user presses down on the knob, as shown in the third stage 1515. Once this selection is finalized, the application removes the route list from the information display area and in its place displays information about the newly selected third route in this area.

Figure 16:
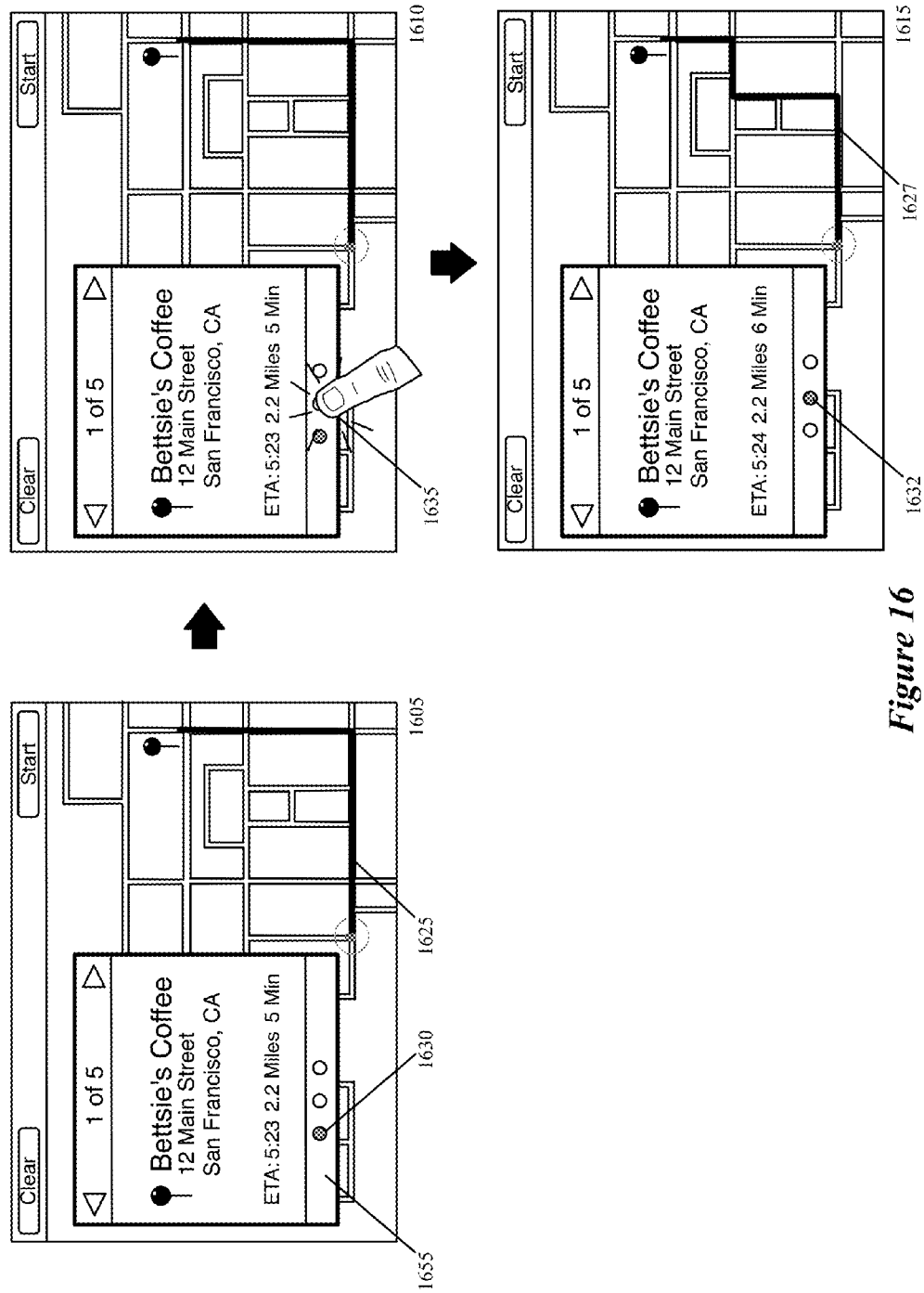
FIG. 16 illustrates an alternative implementation for the route affordance tool.

FIG. 16 illustrates an alternative implementation for the route affordance tool. This implementation does not use a route list 1450. In this implementation, the route affordance 955 has been replaced with route-selection affordance 1655. This affordance includes a selectable shape (e.g., a circle) for each route to the current destination. In this example, three circles are shown for three possible routes, but other examples might have different number of shapes for different number of routes. By selecting any of the shapes in the affordance 1655, the user can direct the application to present the route associated with the selected shape on the map that is displayed on the route overview page.

The example illustrated in FIG. 16 is presented in three stages 1605, 1610, and 1615. The first stage 1605 shows a first route 1625 that is displayed on the map. In this stage, the first circle 1630 of the route-selection affordance 1655 is highlighted to indicate that the map is displaying the first of three possible routes to the current location. The second stage 1610 shows the selection of the second circle 1635. The third stage 1615 shows that this selection causes the application to remove the first route 1625 and replace it with a second route 1627 to the current destination. In this stage, the second circle 1632 of the route-selection affordance 1655 is highlighted to indicate that the map is displaying the second possible route to the current destination.

Figure 17:
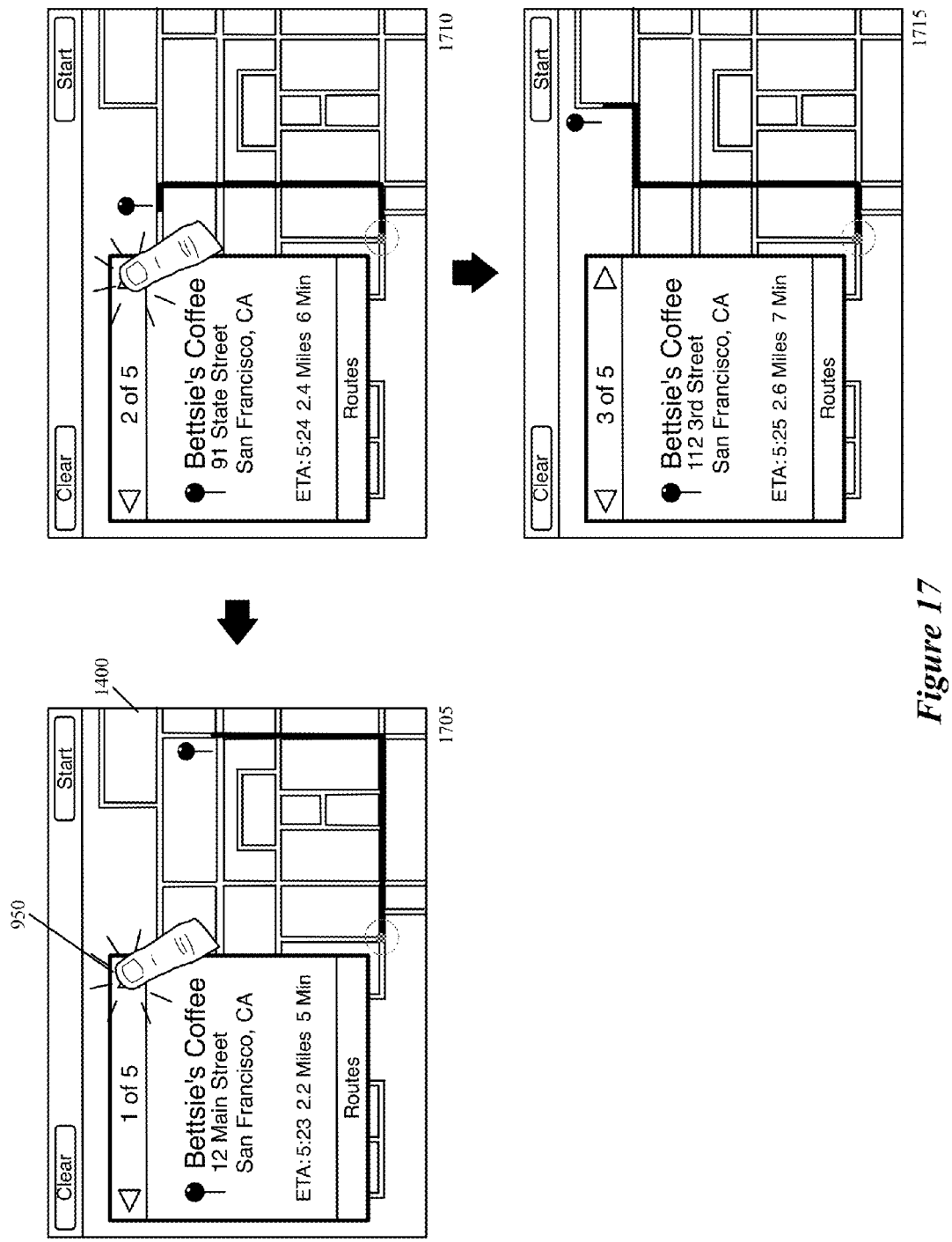
FIG. 17 presents an example that illustrates the use of the location-selection arrows to examine other search results while being in the route-preview mode.

FIG. 17 presents an example that illustrates the use of the location-selection arrows 950 to examine other search results while being in the route-preview mode. This example is illustrated in three operational stages 1705, 1710, and 1715. The first stage 1705 shows a route-preview page 1400 that the application initially presents after the user selects the search result 1140 in FIG. 11 or 12. The contents of this page were described above by reference to FIG. 14.

The first stage 1705 shows the selection of the right location-selection arrow 950. As shown by the second stage

1710, this selection causes the application to show another search result (the second search result in this example) from the search result page 1135, and a route to this newly selected search result. The second stage 1710 also shows another selection of the right location-selection arrow 950. As shown by the third stage 1715, this selection causes the application to show another search result (the third search result in this example) from the search result page 1135, and a route to this newly selected search result. By using the left and right arrows 950, the user can cycle through different search results from the search result page, while viewing the route-preview page. These arrows serve as controls that allow the user to search the search-result solution space, which is one dimension of the solution space with the other dimension being the route solution space. When combined with the route-selection affordance 955, the location-selection affordance 950 allows a user to examine both dimensions of the solution space while viewing the route-preview page 1400.

Figure 18:
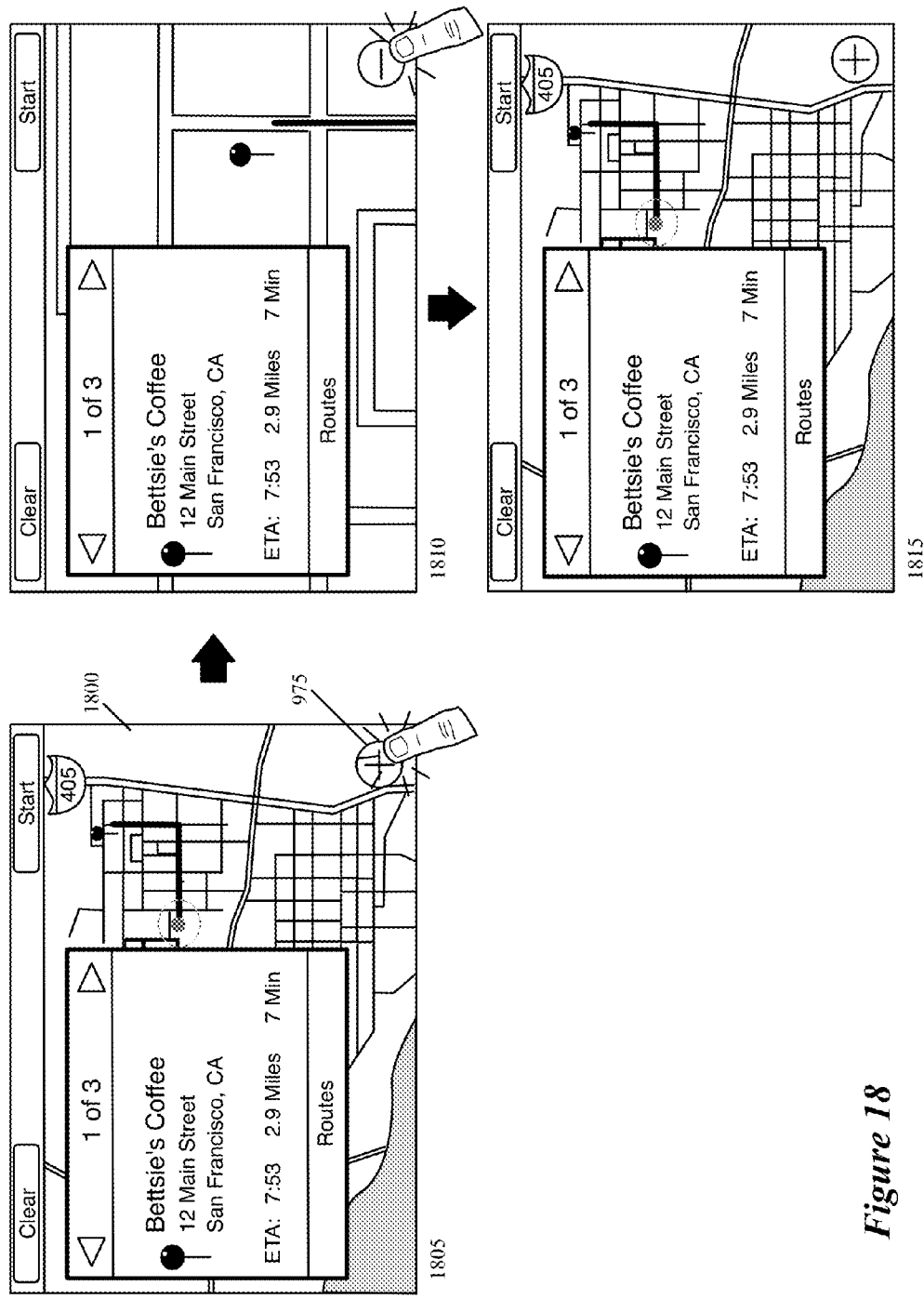
FIG. 18 presents an example that illustrates the use of the zoom affordance.
Figure 19:
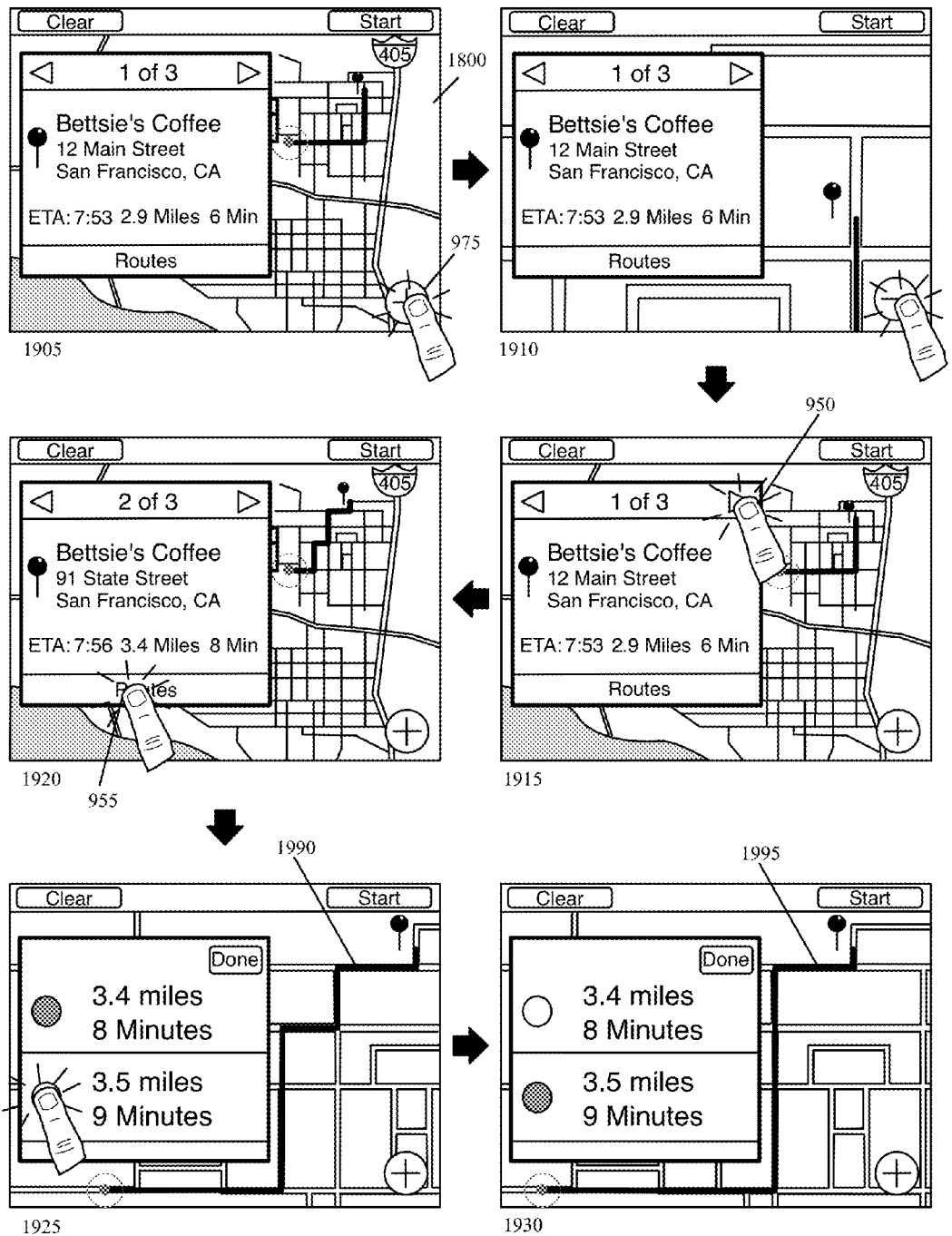
FIG. 19 illustrates an example of a user utilizing all three tools together to explore the two-dimensional solution space of possible locations and possible routes to the locations.

FIG. 18 presents an example that illustrates the use of the zoom affordance 975. This example is illustrated in three operational stages 1805, 1810, and 1815. The first stage 1805 shows a route-preview page 1800 that the application initially presents after the user selects the search result 1140 in FIG. 11 or 12. This page is similar to route-preview page 1400, except that the map in page 1800 appears at a lower zoom level (i.e., the map view is zoomed out much more) in order to provide a better conceptual illustration of the functionality that is provided by the zoom control 975. With the exception of this difference, the contents of the page 1800 are similar to those of page 1400, and will not be further described here as they were described above.

The first stage 1805 shows a zoomed-out view of the map that provides an overview of the route from the current location of the device to the selected destination. The first stage 1805 also shows the selection of the zoom control 975. In the example illustrated in this and other figures, the zoom control 975 appears either as a plus sign or as a minus sign to signify that the map view is either zoomed out to provide an overview of the route or zoomed in to provide a more-detailed view of the destination. Before this control is selected in the first stage 1805, this control is a plus sign.

As shown by the second stage 1810, the selection of the zoom control 975 causes the application to zoom in to the location of the destination on the map to provide a more-detailed view of this location. This stage also shows that the zoom control 975 has changed to a minus sign. The second stage 1810 further shows another selection of the zoom control 975. As shown by the third stage 1815, this selection causes the application to zoom out of the map (i.e., to change the zoom level at which it presents the map) to provide a view of the route from the current location of the device to the destination. In this stage 1815, the zoom control changes back to the plus sign.

FIG. 19 illustrates an example set of interactions that shows how the route-selection control 955, the location-selection control 950 and the zoom control 975 can be used together to quickly examine different search results and routes to the different search results. This example is illustrated in six operational stages 1905-1930. In this example, the user steps through the coffee shop search results that were shown on the search result page 1135 of FIG. 11 or 12. Using the three controls 950, 955 and 975 to step through such generic search locations is a great example of the utility of these controls, because a user might only distinguish these results based on their specific locations and routes to these locations.

The first stage 1905 shows a route-preview page 1800 of FIG. 18. At this stage 1905, the zoomed-out view of the map is shown and this view provides an overview of the route from the current location of the device to the selected search result, which is the destination of the route. The first stage 1805 also shows the selection of the zoom control 975. As shown by the second stage 1910, the selection of the zoom control 975 causes the application to zoom in to the location of the destination on the map to provide a more-detailed view of this location. Also, by zooming to the location of the destination, the user (1) can view traffic data (e.g., traffic patterns, accidents, construction information, etc.) on the map, or (2) in embodiments that show traffic data on both zoomed in and zoomed out views, can view the traffic data more clearly around the selected destination. Zooming in also allows the user to gain a better understanding of other aspects (e.g., neighboring streets, nearby businesses, etc.) of the location of the selected destination.

The second stage 1910 shows another selection of the zoom control 975. As shown by the third stage 1915, this selection causes the application to zoom out to provide a view of the route from the current location of the device to the destination. The third stage 1915 shows the selection of the right location-selection arrow 950. As shown by the fourth stage 1920, this selection causes the application to show another search result (the second search result in this example) from the search result page 1135, and a route to this newly selected search result. After zooming to the location of the first search result in the second stage 1910, the user may realize that he does not wish to see a route to that location (e.g., may see on the map too much traffic around that location or may realize that the selected result is not the desired coffee shop by identifying its location or some of the nearby streets). Hence, by zooming out and selecting another search result in the second and third stages 1910 and 1915, the user can see a preview of a route to another possible coffee shop.

The fourth stage 1920 shows the selection of the route-selection affordance 955. As shown by the fifth stage 1925, this selection causes the opening of the route list 1450, which shows two routes from the current location of the device to the selected second search result. The fifth stage 1925 also shows the selection of the second route representation on the route list. As shown by the sixth stage 1930, this selection directs the application to remove from the map a first route 1990 (shown in the fourth and fifth stages 1920 and 1925) to the second search result and instead to show a second route 1995 (shown in the sixth stage 1930) to the second search result. Thus, after zooming out and selecting another search result in the second and third stages 1910 and 1915, and then viewing the other search result on the map during the fourth stage 1920, the user can select and examine a second route to this other search result in the fifth and sixth stages 1925 and 1930.

Figure 20:
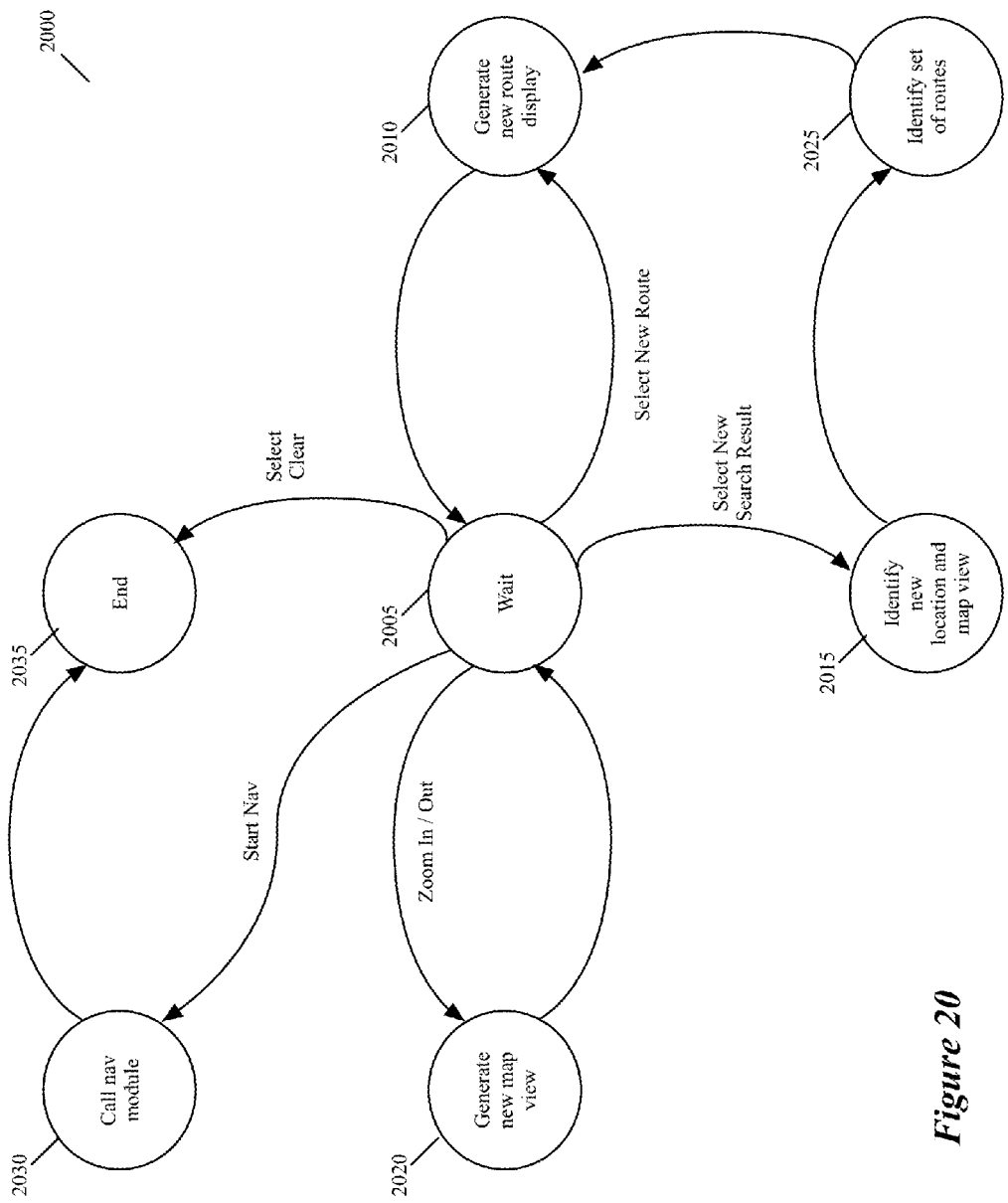
FIG. 20 presents a state diagram that illustrates the operations of the mapping application while presenting the route-preview page.

FIG. 20 presents a state diagram 2000 that illustrates the operations of the mapping application while presenting the route-preview page 1400. As mentioned above, the route-preview page displays a route to a selected search result from the search result page 1135, and provides three tools (the route selection control 955, the location-selection control 1452, and the zoom control 975) to examine different search results and different routes to the search results.

As shown in FIG. 20, a wait state 2005 is the default state of the application while presenting the route-preview page 1400. From this state, the application transitions to the map-generation state 2020, each time the zoom control 975 is selected to zoom to the location of the displayed search result or to zoom out to view the entire route from the device's current location to the location of the displayed search result. In the map generation state 2020, the application generates the zoomed in/out map and displays this generated map. After displaying this map, the application transitions back to the wait state 2005.

From the wait state 2005, the application transitions to the route-generate state 2010, each time a user selects a different route to the search result through the route selection control 955 and the route list 1450. In the route generation state 2010, the application generates the newly specified route and displays this generated route on the displayed map. After displaying this route, the application transitions back to the wait state 2005.

When a new search result is selected through the location-selection control 1452, the application transitions from the wait state 2005 to state 2015, where it identifies the location of the newly specified search result, and generates the map view for this location at the current zoom level (which is specified by the current value of the zoom control 975). From 2015, the application transitions to 2025 in order to identify a set of one or more routes to the newly specified search result. As mentioned above, the application uses one or more external servers to generate such a set of routes in some embodiments, while in other embodiments, it uses a route-identifying module that executes on the device to identify this set of routes.

From 2025, the application transition to the route generation state 2010, where the application generates one of the newly identified routes and displays this generated route on the map generated at 2015. After displaying this route, the application transitions back to the wait state 2005.

From the wait state 2005, the application transitions to the end state 2035 to remove the route preview controls (e.g., controls 955, 1452, and 975) and end the route preview, when the Clear control 944 is selected on the route preview page 1452. On the other hand, when the Start control 942 is selected on the route preview page 1452, the applications transitions from the wait state 2005 to the state 2030. In this state 2030, the process calls a navigation module of the application to start a turn-by-turn navigation presentation to the current search result that is being displayed on the route preview page along the current route that is being displayed on this page. After making this call, the application transitions to the end state 2035 to remove the route preview controls (e.g., controls 955, 1452, and 975), and the route preview map.

In some embodiments, a user can direct the mapping application to start a turn-by-turn prompting navigation presentation in variety of ways. For instance, as mentioned above, the user can request such a presentation by (1) selecting the guidance affordance 340 when prompted to select either a non-prompting navigation presentation or a turn-by-turn prompting navigation presentation, or (2) selecting the start affordance 942 on a route-preview page 970 or 1400.

Figure 21:
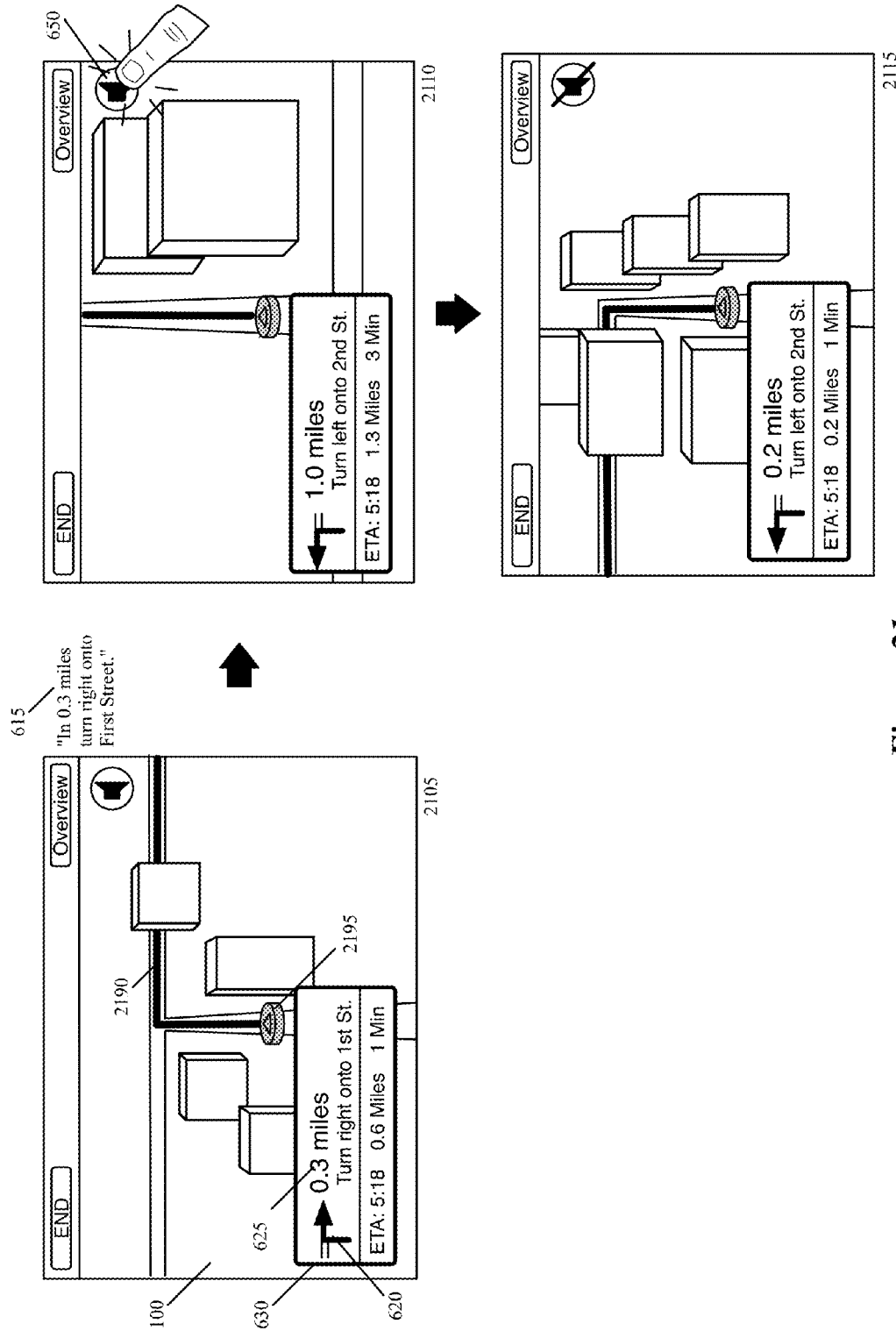
FIG. 21 presents an example that illustrates the use of the mute affordance of some embodiments.

The turn-by-turn prompting navigation presentation of some embodiments has several novel features, including an easily accessible mute affordance and a maneuver notification banner that dynamically updates during the overview mode. FIG. 21 presents an example that illustrates the use of the mute affordance 650 of some embodiments. This example is illustrated in terms of three operational stages 2105, 2110, and 2115 of the UI 100. The first stage 2105 shows the UI 100 during a turn-by-turn navigation presentation. As shown in this figure, the mapping application during this presentation provides (1) a representation 2190 of the navigated route (e.g., a colored line that traverses a road network presented on a navigation map), and (2) a representation 2195 of the device as it travels along the navigated route.

The turn-by-turn navigation also provides maneuver instructions regarding navigation maneuvers as the device approaches junctures along the navigated route at which a user may need to make decisions regarding the maneuvers. In the illustrated example, the maneuver instructions include verbal instructions, graphical instruction and text instructions. As shown, a verbal instruction 615 is provided in the first stage 2105 as the device is approaching a right turn. As further shown in this stage 2105, the turn-by-turn navigation presentation in some embodiments includes an information-display overlay 630, which displays the graphical instructions 620 and the text instructions 625 regarding upcoming maneuvers. In some embodiments, the graphical instruction is a stylized arrow that is indicative of the maneuver to perform. The text instructions specify the distance (i.e., 1 mile) to the maneuver, the maneuver itself (i.e., right turn), and the street after the maneuver (i.e., first street). In some embodiments, the overlay 630 also includes data about the navigated route. In this example, this data include ETA, distance, and ETD for the destination.

The first stage 2105 also illustrates that the turn-by-turn navigation displays the mute affordance 650 on top of the map that is used to display the navigated route. This affordance is for turning off the voice maneuver instructions that would otherwise be provided at junctures along the navigated route. In some embodiments, this affordance has two appearances, a first appearance when it has not been enabled (i.e., when voice-instructions are enabled), and a second appearance when it has been enabled (i.e., when the voice-instructions are muted/disabled). In this example, the two appearances include a picture of a speaker, but the second appearance has a line across the speaker to signify that it mute option has been enabled.

The second stage 2110 shows the selection of the mute affordance 650 when it previously not enabled in the first stage 2105. As shown in the third stage 2115, this selection causes this control 650 to assume its second appearance, which has a line going through the displayed speaker picture in order to convey that the mute option has been enabled. The third stage 2115 also shows that, with the mute option enabled, the application does not provide voice instructions regarding a maneuver to perform, as the device approaches a left turn along the navigated route.

Figure 22:
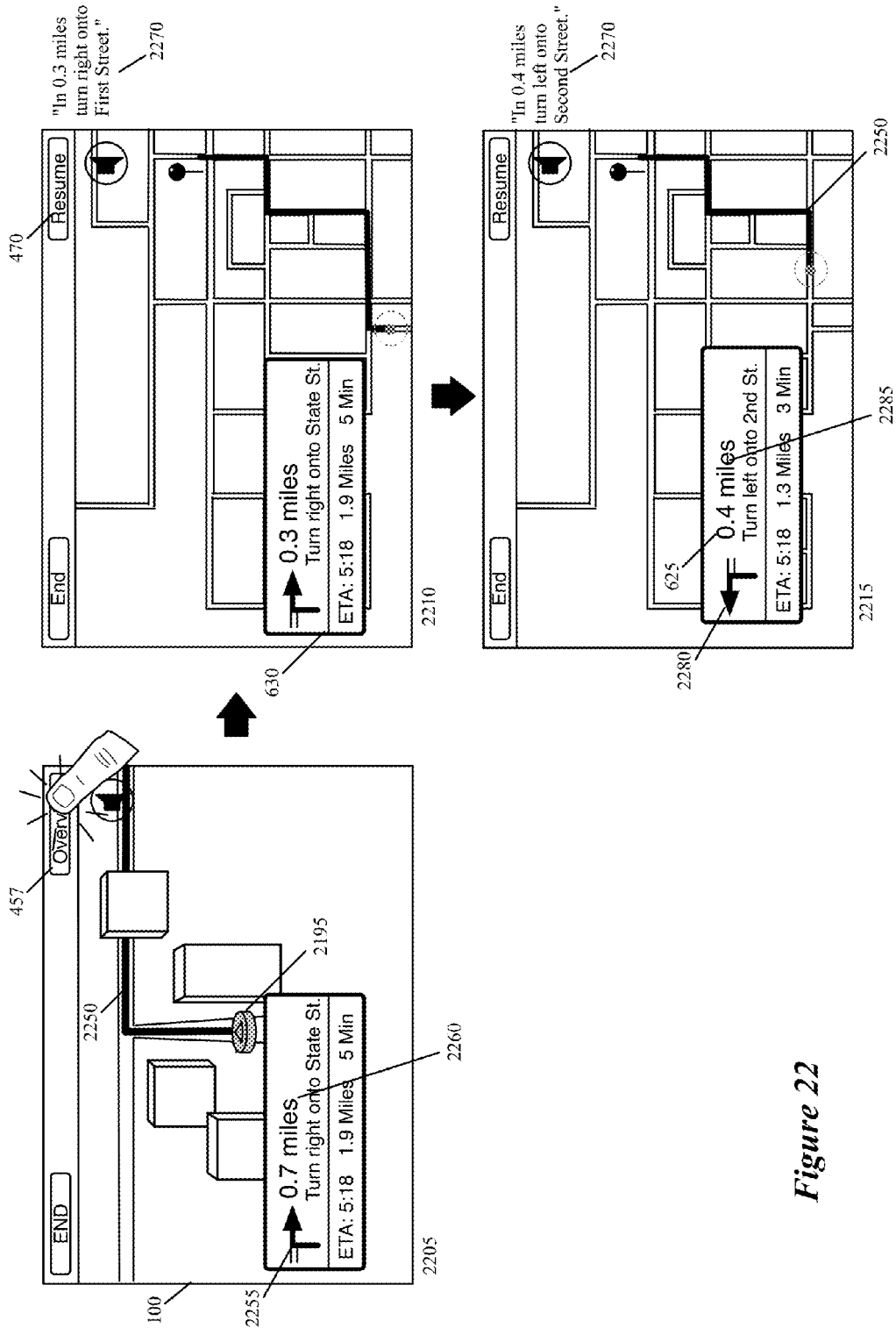
FIG. 22 presents an example that illustrates the instructions in the information-display overlay 630 dynamically updating while the turn-by-turn navigation is an overview mode.

FIG. 22 presents an example that illustrates the instructions in the information-display overlay 630 dynamically updating while the turn-by-turn navigation is an overview mode. This example is illustrated in terms of three operational stages 2205, 2210, and 2215 of the UI 100. The first stage 2205 shows the UI 100 during a turn-by-turn prompting navigation presentation. In some embodiments, the mapping application has two different turn-by-turn navigation presentations, which are a detailed turn-by-turn prompting navigation presentation and an overview turn-by-turn prompting navigation presentation. In some embodiments, the detailed turn-by-turn navigation presentation in some embodiments can be either a two dimensional presentation or a three dimensional presentation, while the overview turn-by-turn navigation presentation is a two dimensional presentation. Also, in some embodiments, the overview presentation displays the destination, the device's current location, and the entire route from the current location to the destination, while the detailed presentation appears at a higher zoom level to show more detail around the current position of the device. As mentioned above by reference to FIG. 4, some embodiments also provide two non-prompting navigation presentations, which are a three-dimensional non-prompting presentation and a two-dimensional non-prompting presentation.

In the first stage 2205, the turn-by-turn prompting navigation presentation is a detailed three-dimensional presentation that shows the device 2195 moving along a navigated route 2250 that is presented in a three-dimensional scene. The first stage 2205 also shows the selection of the Overview affordance 457. In some embodiments, this presentation is generated by rendering the map, the navigated route, and the device representation from a position of a virtual camera (i.e., from a rendering position) that is behind the location of the device 2195 looking towards the device 2195 at a side perspective angle. As the device moves, this virtual camera moves with the device.

The first stage 2205 shows the device 2195 approaching a juncture at which a right turn has to be made. Accordingly, the information-display overlay 630 displays a right turn arrow 2255 and right-turn instructions 2260 to provide information to the user regarding the maneuver that the user has to perform at the juncture. In this stage, the application may provide verbal instructions regarding this maneuver.

The second stage 2210 shows that this selection has caused the application to switch to an overview mode of the turn-by-turn prompting navigation presentation. In this mode, the presentation is provided in a top-down two-dimensional view of the map that is being navigated. In some embodiments, this view is generated by rendering the map, the navigated route, and the device representation from a perspective of a virtual camera (i.e., from a rendering position) that is directly looking down on the map from a position directly above it. This virtual camera position (i.e., this rendering position) is in contrast to the perspective side position used to render the three-dimensional presentation of the first stage 2205.

The second stage 2210 also shows that like the detailed turn-by-turn prompting navigation presentation, the overview turn-by-turn prompting navigation presentation provides graphical and text maneuver instructions 2255 and 2260 (through the information-display overlay 630) and verbal instructions 2270. The second stage also shows that in the overview presentation the Overview control in the detailed presentation has been replaced by the Resume control 470. When selected, the Resume control 470 directs the application to transition from the overview turn-by-turn prompting navigation presentation to the detailed turn-by-turn prompting navigation presentation.

During the overview navigation presentation, the information-display overlay 630 continues to dynamically provide maneuver instructions regarding each subsequent juncture along the navigated route. The third stage 2215 shows the graphical and text instructions 2280 and 2285 updating in this overlay after the user performs the right turn that was specified in the second stage. These updated instructions highlight for the user a left turn that is the next maneuver to perform at the next juncture along the navigated route 2250. The third stage 2215 also shows that the application provides verbal instructions 2270 regarding this maneuver.

Figure 23:
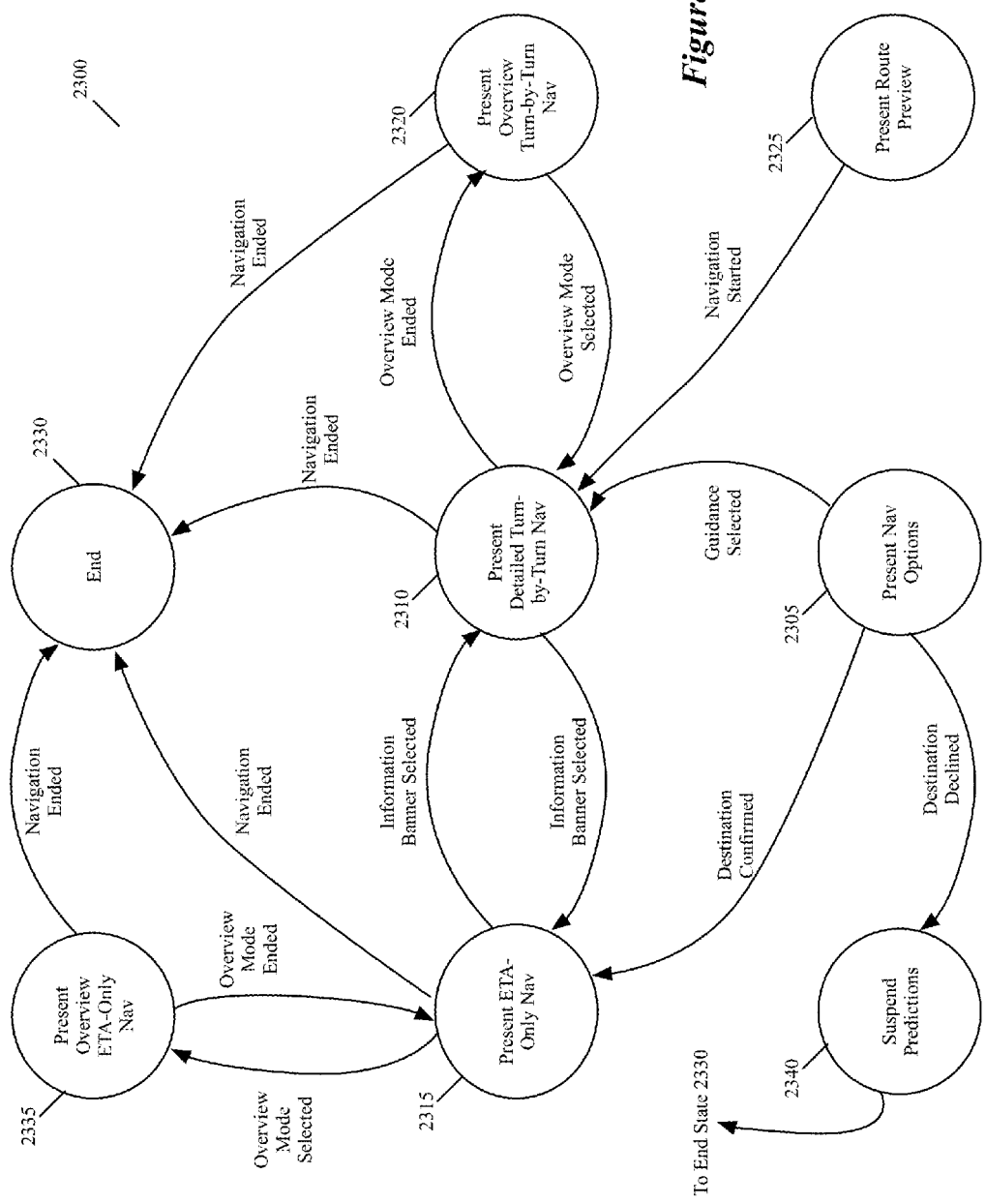
FIG. 23 illustrates a state diagram that shows the operations of a navigation module of the mapping application during these presentations.

As described above, the mapping application of some embodiments provides four navigation presentations, which are (1) a non-prompting three-dimensional navigation presentation, (2) a non-prompting overview navigation presentation, (3) a detailed turn-by-turn prompting navigation presentation, and (4) an overview turn-by-turn prompting navigation presentation. FIG. 23 illustrates a state diagram 2300 that shows the operations of a navigation module of the mapping application during these presentations. Specifically, this diagram illustrates how the navigation module in some embodiments transitions between three different states 2310, 2315 and 2320 that are associated with the three different navigation presentations.

As shown, the state diagram includes a navigation presentation state 2305 and a route-preview state 2325. When in the navigation presentation state 2305, the mapping application presents the three navigation options 330, 335 and 340 after a predicted-destination notification 150 is selected, as shown in FIG. 3. When in the route-preview state 2325, the mapping application presents a route-preview page 970 or 1400 to display a destination/search result, the device's current location, and a route to the displayed destination/search result.

Both the navigation option page and the route-preview page provide controls 340 and 942 for initiating a turn-by-turn prompting navigation presentation. As shown in FIG. 23, selection of these controls directs the application's navigation module to transition to the detailed turn-by-turn navigation state 2310 to present a detailed turn-by-turn navigation presentation. The navigation option page also presents a control 330 for initiating a non-prompting navigation presentation. As shown in FIG. 23, selection of this control 330 causes the application to transition from the navigation option presenting state 2305 to the non-prompting navigation state 2315. In this state 2315, the navigation module presents a non-prompting navigation presentation.

The state diagram 2300 also shows that the navigation module changes from the detailed turn-by-turn navigation state to the non-prompting navigation state, and vice versa, upon selection of the information display overlay 630. This toggling causes the navigation module to switch between the detailed turn-by-turn navigation presentation and the non-prompting navigation presentation, as described above by reference to FIG. 8.

The state diagram 2300 further shows that the navigation module changes from the detailed turn-by-turn navigation state to the overview-navigation navigation state, and vice versa, upon selection of the either the Overview control 457 or the Resume control 470. This switching causes the navigation module to switch between the three-dimensional non-prompting navigation presentation and the two-dimensional non-prompting navigation presentation, as described above by reference to FIG. 4.

The state diagram 2300 also shows that the navigation module transitioning from a three-dimensional non-prompting state to a two-dimensional non-prompting navigation state, and vice versa, upon selection of the Overview control 457 or the Resume control 470. This toggling causes the navigation module to switch between the detailed turn-by-turn navigation presentation and the non-prompting navigation presentation, as described above by reference to FIG. 8.

The state diagram 2300 also shows the application transitioning to a Suspend Prediction state 2340 when the No option 335 is selected on the navigation option page. In this state 2340, the application disables the automatic destination prediction processes (1) for the destination that was subject of the presented navigation options in some embodiments, or (2) for all destinations in other embodiments. As mentioned above, the automatic prediction processes are disabled in such a situation until the device terminates a travel session in some embodiments, or until the device disconnects and then reconnects with a vehicle's electronic system in other embodiments. From the Suspend Prediction state, the application transitions to the End state 2330, as shown in FIG. 23.

The state diagram 2300 further shows the navigation module transitioning to an End state 2330 from any of the navigation presentation states once the End control 455 is selected. This transition causes the navigation module to end the navigation presentation corresponding to the navigation presentation state in which it was residing. In some embodiments, the mapping application transitions from the non-prompting navigation state 2315 or 2335 to the Suspend Prediction state 2340 when the End control 455 is selected. This is because in these embodiments the prediction formulation is disabled after a non-prompting presentation is terminated by a user, until the device terminates a travel session in some embodiments, or until the device disconnects and then reconnects with a vehicle's electronic system in other embodiments.

As mentioned above, some embodiments of the invention provide a mapping application that executes on a mobile device to provide map and navigation displays on the electronic system of a vehicle. To do this, the mapping application in some embodiments can generate multiple user interfaces for display on multiple devices at the same time. In some embodiments, the application generates both (i) a user interface for display on the mobile device and (ii) a user interface for display on a screen of the vehicle to which the mobile device connects. The mapping application generates both user interfaces simultaneously for simultaneous output and display.

Figure 24:
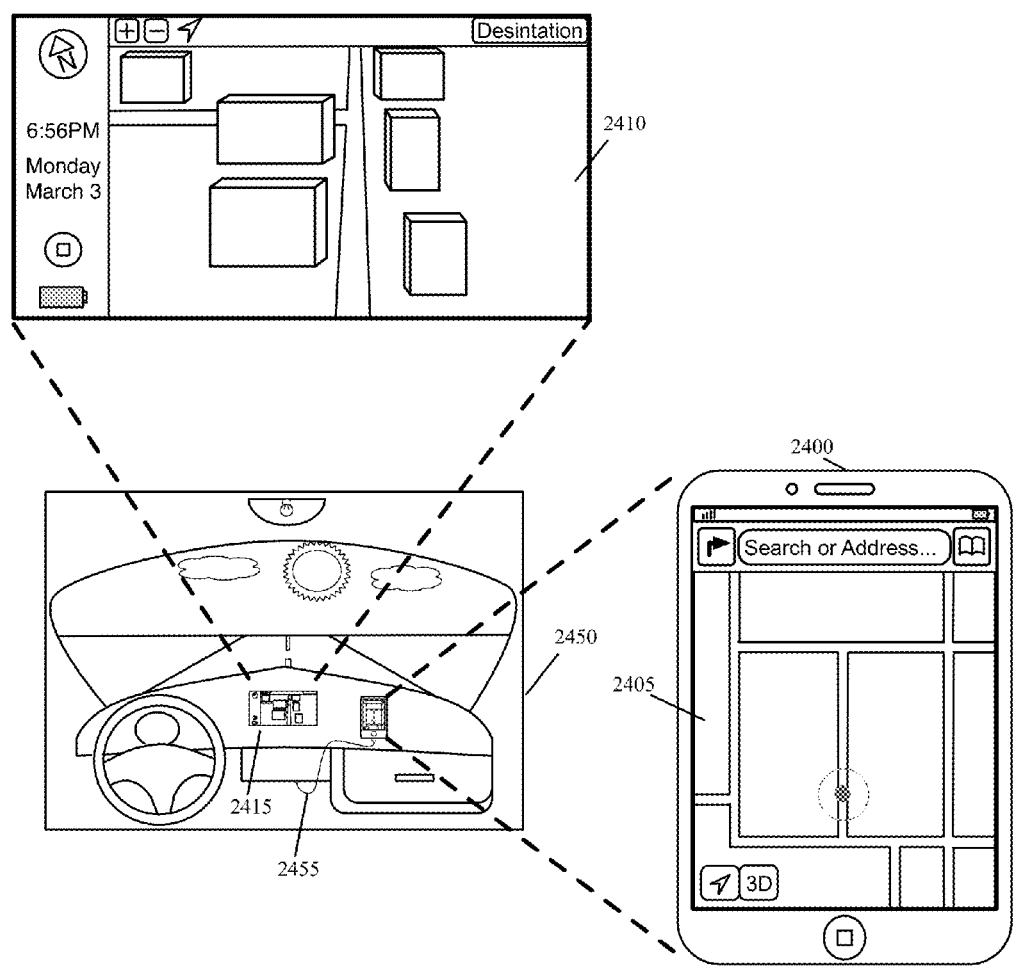
FIG. 24 illustrates an example of a mobile device that executes a mapping application that outputs a first user interface display on the mobile device's display screen and a second user interface display on a vehicle's display screen.

FIG. 24 illustrates an example of a mobile device 2400 that executes a mapping application that outputs a first user interface display 2405 on the mobile device's display screen and a second user interface display 2410 on the vehicle's display screen 2415. The figure illustrates the interior of a vehicle 2450, in which the mobile device 2400 connects via a wired connection 2455 to the vehicle, and outputs a user interface for display on the vehicle screen 2415. While this example illustrates a wired connection 2455, in other embodiments the mobile device connects with the vehicle's electronic information system through a wireless connection (e.g., through a Bluetooth connection). Also, although one display screen in the vehicle is shown in this example, the mapping application of some embodiments may drive multiple display screens of a vehicle.

FIG. 24 illustrates blown-up views of the mobile device 2400 and the dashboard screen 2415. As shown, both views display a map of the same location, but within the context of different user interfaces. When directed to present a navigation presentation, the mapping application provides such a presentation on the dashboard screen 2415. This presentation may be a non-prompting presentation or a turn-by-turn navigation presentation.

The mapping application of some embodiments generates different user interfaces for display on the screens of different types of vehicles. Some embodiments generate different user interfaces for each different individual vehicle. On the other hand, some embodiments generate different user interfaces for categories of vehicle screens, such as high-quality touchscreens, low-quality touchscreens, and non-touch screens (with which a user interacts via separate controls built into the vehicle). The mapping application of some embodiments, when connected to a vehicle, identifies the type of display screen built into the vehicle, and automatically outputs the correct user interface for the vehicle. U.S. patent application Ser. No. 14/081,896 describes how the mapping application of some embodiments supports different categories of vehicle screens. This application (Ser. No. 14/081,896) is incorporated herein by reference.

Figure 25:
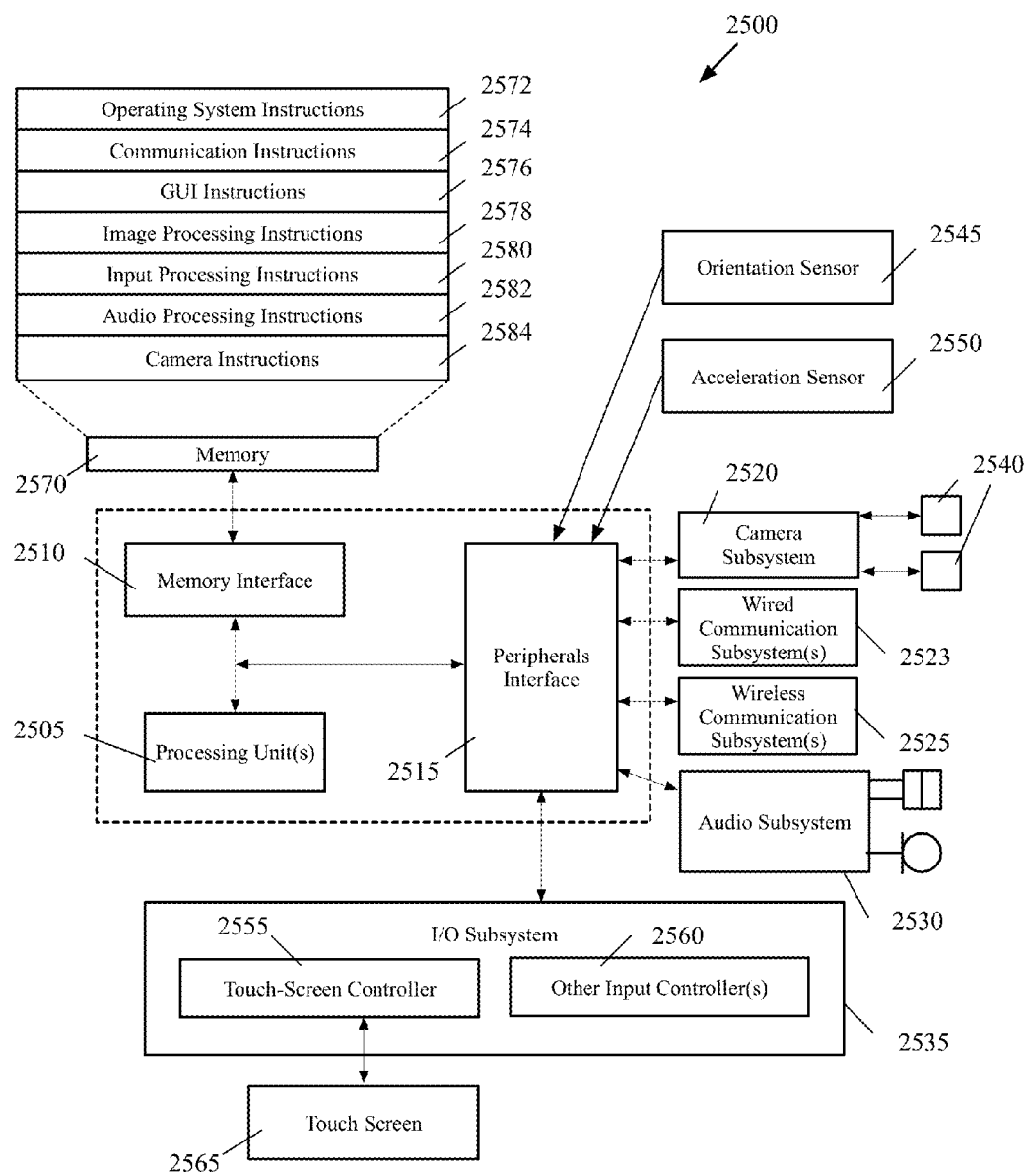
FIG. 25 provides an example of the architecture of a mobile computing device on which the mapping and navigation applications of some embodiments execute.

The mapping and navigation applications of some embodiments operate on mobile devices, such as smart phones (e.g., iPhones®) and tablets (e.g., iPads®). FIG. 25 is an example of an architecture 2500 of such a mobile computing device. Examples of mobile computing devices include smartphones, tablets, laptops, etc. As shown, the mobile computing device 2500 includes one or more processing units 2505, a memory interface 2510 and a peripherals interface 2515.

The peripherals interface 2515 is coupled to various sensors and subsystems, including a camera subsystem 2520, a wired communication subsystem(s) 2523, a wireless communication subsystem(s) 2525, an audio subsystem 2530, an I/O subsystem 2535, etc. The peripherals interface 2515 enables communication between the processing units 2505 and various peripherals. For example, an orientation sensor 2545 (e.g., a gyroscope) and an acceleration sensor 2550 (e.g., an accelerometer) are coupled to the peripherals interface 2515 to facilitate orientation and acceleration functions.

The camera subsystem 2520 is coupled to one or more optical sensors 2540 (e.g., a charged coupled device (CCD) optical sensor, a complementary metal-oxide-semiconductor (CMOS) optical sensor, etc.). The camera subsystem 2520 coupled with the optical sensors 2540 facilitates camera functions, such as image and/or video data capturing. The wired communication subsystem 2523 and wireless communication subsystem 2525 serve to facilitate communication functions. In some embodiments, the wired communication system includes a USB connector for connecting the mobile device 2500 to a vehicle electronic system. The interface of some embodiments for communicating with a vehicle electronic system is described in further detail in U.S. Patent Publications 2009/0284476, 2010/0293462, 2011/0145863, 2011/0246891, and 2011/0265003, which are incorporated by reference above.

In some embodiments, the wireless communication subsystem 2525 includes radio frequency receivers and transmitters, and optical receivers and transmitters (not shown in FIG. 25). These receivers and transmitters of some embodiments are implemented to operate over one or more communication networks such as a GSM network, a Wi-Fi network, a Bluetooth network, etc. The audio subsystem 2530 is coupled to a speaker to output audio (e.g., to output voice navigation instructions). Additionally, the audio subsystem 2530 is coupled to a microphone to facilitate voice-enabled functions, such as voice recognition (e.g., for searching), digital recording, etc.

The I/O subsystem 2535 involves the transfer between input/output peripheral devices, such as a display, a touch screen, etc., and the data bus of the processing units 2505 through the peripherals interface 2515. The I/O subsystem 2535 includes a touch-screen controller 2555 and other input controllers 2560 to facilitate the transfer between input/output peripheral devices and the data bus of the processing units 2505. As shown, the touch-screen controller 2555 is coupled to a touch screen 2565. The touch-screen controller 2555 detects contact and movement on the touch screen 2565 using any of multiple touch sensitivity technologies. The other input controllers 2560 are coupled to other input/control devices, such as one or more buttons. Some embodiments include a near-touch sensitive screen and a corresponding controller that can detect near-touch interactions instead of or in addition to touch interactions.

The memory interface 2510 is coupled to memory 2570. In some embodiments, the memory 2570 includes volatile memory (e.g., high-speed random access memory), non-volatile memory (e.g., flash memory), a combination of volatile and non-volatile memory, and/or any other type of memory. As illustrated in FIG. 25, the memory 2570 stores an operating system (OS) 2572. The OS 2572 includes instructions for handling basic system services and for performing hardware dependent tasks.

The memory 2570 also includes communication instructions 2574 to facilitate communicating with one or more additional devices; graphical user interface instructions 2576 to facilitate graphic user interface processing; image processing instructions 2578 to facilitate image-related processing and functions; input processing instructions 2580 to facilitate input-related (e.g., touch input) processes and functions; audio processing instructions 2582 to facilitate audio-related processes and functions; and camera instructions 2584 to facilitate camera-related processes and functions. The instructions described above are merely exemplary and the memory 2570 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 25 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 25 may be split into two or more integrated circuits.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (e.g., FIGS. 8, 13, 20, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

What is claimed is:

1. A non-transitory machine readable medium storing a mapping application for execution by at least one processing unit, the mapping application comprising sets of instructions for:

presenting, on a display screen, a first user interface (UI) page for providing automatic predicted-location notifications and providing a first UI affordance for a list of predicted locations, wherein the first UI page does not provide a UI affordance for receiving a search query;

responsive to a selection of the first UI affordance for the list of predicted locations, presenting, on a display screen, a second UI page for providing the list of predicted locations and providing a second UI affordance for a verbal search query, wherein the second UI page does not provide a UI affordance for displaying alphanumeric characters for entering a search query through character input; and responsive to a selection of the second UI affordance, presenting, on a display screen, a third UI page for receiving the verbal search query and providing a third UI affordance for displaying alphanumeric characters for entering a search query through character input .

2. The non-transitory machine readable medium of claim 1, wherein the mapping application further comprises a set of instructions for displaying alphanumeric characters for entering the search query through character input upon the selection of the third UI affordance.

3. The non-transitory machine readable medium of claim 2, wherein the mapping application is for presentation on a screen in a vehicle.

4. The non-transitory machine readable medium of claim 1,
wherein the mapping application further comprises a set of instructions for providing an option to request a first navigation presentation or a second navigation presentation to a destination upon selection of an automatic predicted-location notification; and
wherein the first navigation presentation provides maneuver instruction prompts at junctures along a route to the destination, while the second navigation presentation does not provide maneuver instruction prompts at the junctures along the route but provides distance information regarding the device's distance to the destination as the device travels along the route.

5. The non-transitory machine readable medium of claim 4, wherein the selected automatic predicted-location notification presents the destination as a predicted destination.

6. A method of hierarchically arranging location-input user interface (UI) elements in a UI of a mapping application, the method comprising:
displaying, on a display screen, a first map user interface (UI) page for displaying a map, providing automatic predicted-location notifications, and providing a first UI affordance for a list of predicted locations;
in response to a selection of the first UI affordance for the list of predicted locations, displaying, on a display screen, a second destination-list UI page for providing the list of predicted locations, and providing a second UI affordance for a verbal search query, wherein the second destination-list UI page does not provide a UI affordance for displaying alphanumeric characters for entering a search query through character input;
in response to a selection of the second UI affordance for the verbal search query, displaying, on a display screen, a third search UI page for receiving the verbal search query, wherein the second UI affordance and the third search UI page are provided to allow a location to be manually entered when the location does not appear as one of the predicted locations on the second UI page.

7. The method of claim 6, wherein the first UI page does not provide a UI affordance for receiving a search query.

8. The method of claim 7, wherein the second UI page does not provide a UI affordance for displaying alphanumeric characters for entering a search query through character input.

9. The method of claim 8,
wherein the mapping application is for presentation on a screen in a vehicle,
wherein the successive presentation of the first, second, and third UI pages and sequential providing of the first and second UI affordances represent hierarchal arrangements of the UI pages and UI affordances in which UI affordances that require less user interaction to specify a destination are presented before the affordances that require more user interaction to specify the destination.

10. The method of claim 6 further comprising displaying an option to request a first navigation presentation or a second navigation presentation to a destination upon selection of an automatic predicted-location notification, wherein the first navigation presentation provides maneuver instruction prompts at junctures along a route to the destination, while the second navigation presentation does not provide maneuver instruction prompts at the junctures along the route but provides distance information regarding the device's distance to the destination as the device travels along the route.

11. An electronic device comprising
at least one processing unit;
a non-transitory machine readable medium storing a mapping application for execution by the processing unit, the mapping application comprising a user interface (UI) that comprises:
a first UI page for providing at least one predicted location;
a second UI page for receiving a verbal search query;
a third UI page for displaying alphanumeric characters for entering a character-input search query;
the first UI page providing a first UI affordance for viewing the second UI page for receiving a verbal search query but not a UI affordance for viewing the third UI page for displaying alphanumeric characters for entering a character-input search query; and
the second UI page providing a second UI affordance for viewing the third UI page,
wherein the second UI affordance and the third search UI page are provided to allow a location to be manually entered through the selection of alphanumeric characters.

12. The electronic device of claim 11, wherein the UI further comprises a fourth UI page that is presented before the first UI page and that provides (i) automatic predicted-location notifications and (ii) a third UI affordance for viewing the first UI page to view a list of predicted locations.

13. The electronic device of claim 11,
wherein the mapping application is for presentation on a screen in a vehicle,
wherein the successive presentation of the first, second, and third UI pages and sequential providing of the first and second UI affordances represent hierarchal arrangements of the UI pages and UI affordances in which UI affordances that require less user interaction to specify a destination are presented before the UI affordances that require more user interaction to specify the destination.

14. The electronic device of claim 11, wherein the first UI page does not provide a UI affordance for receiving a search query through character input.

15. An electronic device comprising
at least one processing unit;
a non-transitory machine readable medium storing a mapping application for execution by the processing unit, the mapping application comprising a user interface (UI) that comprises:
a first UI page providing automatic predicted-destination notifications;
a second UI page providing a list of predicted destinations;
a third UI page for receiving a verbal search query; and
a fourth UI page for receiving a search query through alphanumeric character input;
wherein:
the first UI page provides a first UI affordance for viewing the second UI page;
the second UI page provides a second UI affordance for viewing the third UI page and not a UI affordance for viewing the fourth UI page; and
the third UI page provides a third UI affordance for viewing the fourth UI page.

16. The electronic device of claim 15,
wherein the mapping application is for presentation on a screen in a vehicle,
wherein the successive presentation of the first and second UI pages represents hierarchal arrangements of the UI pages in which UI pages that require less user interaction to specify a destination are presented before the UI pages that require more user interaction to specify the destination.

17. The non-transitory machine readable medium of claim 1, the mapping application comprising sets of instructions for presenting, on a display screen, a fourth UI page for providing a list of different destination search results and routes to the different destination search results and for providing a fourth UI affordance for selection of a destination search result and displaying information of a plurality of routes to the selected destination search result.

18. The non-transitory machine readable medium of claim 17, the mapping application comprising sets of instructions for, responsive to a selection of the fourth UI affordance, presenting, on a display screen, a fifth UI page for displaying information of the plurality of routes to the selected destination search result and providing a fifth affordance for selection of one of the plurality of routes to the selected destination search result.

* * * * *